United States Patent
Ingale et al.

(10) Patent No.: US 11,564,097 B2
(45) Date of Patent: Jan. 24, 2023

(54) METHOD AND USER EQUIPMENT FOR HANDLING OF INTEGRITY CHECK FAILURES OF PDCP PDUS

(71) Applicant: Samsung Electronics Co., Ltd., Suwon-si (KR)

(72) Inventors: Mangesh Abhimanyu Ingale, Bangalore (IN); Anil Agiwal, Suwon-si (KR); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 16/622,837

(22) PCT Filed: Jun. 14, 2018

(86) PCT No.: PCT/KR2018/006728
§ 371 (c)(1),
(2) Date: Dec. 13, 2019

(87) PCT Pub. No.: WO2018/230974
PCT Pub. Date: Dec. 20, 2018

(65) Prior Publication Data
US 2020/0205003 A1 Jun. 25, 2020

(30) Foreign Application Priority Data

Jun. 14, 2017 (IN) .............................. 201741020837
Jun. 13, 2018 (IN) .............................. 201741020837

(51) Int. Cl.
*H04L 9/32* (2006.01)
*H04L 12/04* (2006.01)
(Continued)

(52) U.S. Cl.
CPC ......... *H04W 12/106* (2021.01); *H04L 9/3242* (2013.01); *H04L 12/04* (2013.01); *H04W 76/15* (2018.02); *H04W 80/02* (2013.01)

(58) Field of Classification Search
CPC ... H04W 12/106; H04W 12/04; H04W 76/15; H04W 80/02; H04W 28/02; H04L 9/3242
(Continued)

(56) References Cited

U.S. PATENT DOCUMENTS

2011/0263221 A1  10/2011  Yi et al.
2013/0148490 A1   6/2013  Yi et al.
(Continued)

FOREIGN PATENT DOCUMENTS

AU    2008276061 A1    1/2009
CN      105391521 A    3/2016
(Continued)

OTHER PUBLICATIONS

3GPP TS 33.401 V14.2.0 (Mar. 2017) (Year: 2017).*
(Continued)

*Primary Examiner* — Intekhaab A Siddiquee

(57) ABSTRACT

Embodiments herein provide a method and a UE for handling of integrity check failures of Packet Data Convergence Protocol (PDCP) Protocol Data Units (PDUs) in a wireless communication system. The method includes performing an integrity check at a PDCP layer on at least one Radio Bearer based on a Message Authentication Code-Integrity (MAC-I) of the PDCP PDU. The method includes determining a success of integrity check of the PDCP PDU or a failure of integrity check of the PDCP PDU received on the radio bearer. Further, the method includes discarding the PDCP PDU for which integrity is check failed. Furthermore, the method includes indicating a Radio Resource Control (RRC) layer about the integrity check failure on the at least
(Continued)

one radio bearer in response to determining a trigger condition.

18 Claims, 14 Drawing Sheets

(51) Int. Cl.
*H04W 76/15* (2018.01)
*H04W 80/02* (2009.01)
*H04W 12/106* (2021.01)

(58) Field of Classification Search
USPC .......................................................... 713/168
See application file for complete search history.

(56) References Cited

U.S. PATENT DOCUMENTS

2017/0280501 A1  9/2017  Xu et al.
2018/0316690 A1  11/2018  Cho et al.

FOREIGN PATENT DOCUMENTS

CN       106717108 A      5/2017
KR    10-2013-0055637 A    5/2013
WO       2016208950 A1    12/2016

OTHER PUBLICATIONS

R2-1705170.pdf (Year: 2017).*
R2-1703959.pdf (Year: 2017).*
R2-1705149.pdf (Year: 2017).*
R2-1704192.pdf (Year: 2017).*
ISA/KR, International Search Report and Written Opinion of the International Searching Authority, International Application No. PCT/KR2018/006728, dated Sep. 21, 2018, 9 pages.
3GPP TS 33.401 V14.2.0 (Mar. 2017), Technical Specification, 3rd Generation Partnership Project; Technical Specification Group Services and System Aspects; 3GPP System Architecture Evolution (SAE); Security architecture (Release 14), 152 pages.
Huawei, et al., "Integrity protection and Counter Check Procedure for NR," R2-1705170, 3GPP TSG-RAN WG2 Meeting #98, Hangzhou, China, May 15-19, 2017, 2 pages.
SA3, "Reply LS on actions for integrity check failure on SgNB," S3-171484, Ljubljana, Slovenia, May 15-19, 2017, 1 page.
Samsung, "SCG Failure Handling," R2-1705062, 3GPP TSG-RAN WG2 NR#98, Hangzhou, China, May 15-19, 2017, 3 pages.
Decision of Grant dated Jun. 17, 2022, in connection with Korean Application No. 10-2019-7033750, 6 pages.
China National Intellectual Property Administration, "Notification of the First Office Action," dated Sep. 30, 2022, in connection with Chinese Patent Application No. 201880033886.6, 16 pages.

* cited by examiner

METHOD AND USER EQUIPMENT FOR HANDLING OF INTEGRITY CHECK FAILURES OF PDCP PDUS

CROSS-REFERENCE TO RELATED APPLICATIONS

This application is a National Phase Entry of PCT international Application. No. PCT/KR2018/006728, which was filed on Jun. 14, 2018, and claims priority to Indian Provisional Patent Application No. 201741020837 filed on Jun. 14, 2017 and Indian Complete Patent Application No. 201741020837 filed on Jun. 13, 2018 in the Indian Intellectual Property Office, the contents of which are incorporated herein by reference.

BACKGROUND

1. Field

The present disclosure is related to handling of integrity check failures of Packet Data Convergence Protocol (PDCP) Protocol Data Units (PDUs) received on radio bearers in a wireless communication system. More particularly it is related to a method and a User Equipment (UE) for handling of integrity check failures of PDCP PDUs in the wireless communication system.

2. Description of the Related Art

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MINK)), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the TIE cater service to the end customer. Few example use cases the fifth generation wireless communication system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication system, security protection in access stratum is provided to both control plane signalling i.e. Radio Resource Control (RRC) messages and user plane data. The KeNB (security key) is derived by the UE and the MME using the base key (Kasme) or the new KeNB (security key) is derived by the UE and the eNB, using the active KeNB. Further keys for control plane and user plane are derived based on the KeNB. However, only encryption (i.e. ciphering) is supported for the user plane data between the UE and the eNB. The control plane (i.e. RRC signalling) is subjecting to both encryption (i.e. ciphering) and integrity protection. UE may at PDCP layer detect integrity check failure for RRC signalling messages transmitted on Signalling Radio Bearer (SRB) based on wrong or incorrect message, unintentional or intentional modification of the authentication code (MAC-I). The integrity check failure may be due to packet injection attack on the SRB (commonly referred as man in middle problem) or due to security key or PDCP Count mismatch. If UE detects integrity check failure on SRB then UE performs RRC connection re-establishment procedure to mitigate the packet injection threat or key mismatch issue. In the fourth generation wireless communication system, since there is no integrity protection on the user plane data i.e. Data Radio Bearer (DRB), the integrity check failure on DRB is out of question. However, the packet injection threat or man in middle problem is identified based on the counter check procedure.

In LTE system the counter check procedure is specified in TS 36.331 for detecting packet injection attack. In simple terms this RRC procedure is kind of audit where eNB checks if the COUNT provided by the UE for the established DRBs match with the values sent by the eNB in the request message of the procedure. If such an intruder attack is detected then network may decide to release the RRC connection immediately and initiate the authentication procedure when the UE again initiates the RRC connection to come back to connected state, based on the network policy. For Carrier Aggregation (CA) scenario, the PCell of the UE initiates the counter check procedure for the DRB established on the SCell(s). In the dual connectivity mode of operation, the RRC signalling to the HE is only from the Master eNB (MeNB) where the MCG SRB delivers the RRC messages. Since there is no SRB from the Secondary eNB (SeNB) towards the UE so the integrity check failure on the SRB is out of question. However, for mitigating the packet injection threat on the DRB established in the SeNB, the counter check principle was also extended for dual connectivity mode of operation. The SeNB Counter check procedure is initiated by the SeNB to request the MeNB to execute a counter check procedure to verify the value of the PDCP COUNTs associated with SCG DRBs established in the SeNB The fifth generation wireless communication system is considering enhancement to support for user plane (i.e. DRB) integrity protection. Even though it is mandatory for the UE and network to support integrity protection on DRB the usage of the feature i.e. enabling/disabling integrity protection (can be on DRB) is under network control. The mandatory support for user plane integrity protection is motivated by the need to identify and mitigate the packet injection or packet modification security threat. In current LTE system there are other mechanisms to avoid the user plane integrity protection requirement to identify the packet injection security threat. Such mechanisms rely on the fact that some control plane signaling is exchanged between the RAN and the HE before actual user plane data exchange. The RRC control plane signaling is both encrypted and integrity protected in LTE. In addition, the LTE RAN can initiate the Counter Check procedure if there is suspicion of packet injection from a rogue transmitter.

The fifth generation wireless communication system, in the dual connectivity mode of operation i.e., the LTE and the next generation RAT (NR) interworking, the RRC signalling to the UE is not only from the MeNB SRB but also there is SRB from the SeNB towards the UE. The terms MeNB or Master Node (MN) 100 or MgNB mean the same entity acting as the master in dual connectivity mode of operation. The terms SeNB or Secondary Node (SN) 200 or SgNB mean the same entity acting as the secondary in dual connectivity mode of operation. The UE 300 behavior and actions needs to be specified when the integrity check failure on the established DRB is detected either in the MN 100 or SN 200. In addition, when the integrity check failure on the SRB from SN is detected, the UE behavior and actions needs to be specified. In dual connectivity mode of operation, there are split bearers i.e. MCG Split SRB, MCG Split DRB and SCG Split DRB. With the MCG Split SRB, the RRC message from the MN 100 is handled by the PDCP entity terminated in the MN 100 while the lower layer handling i.e., RLC and MAC handling can either be through the MN 100 or SN 200 entities. For the MCG split DRB the PDCP entity is terminated in the MN 100 while there are either two legs having respective RLC and MAC entities in the MN 100 and the SN 200 or the lower layer handling i.e. RLC and MAC handling can be only through the SN 200 as shown in the FIG. 1a. The MCG bearer and MCG Split bearer(s) as shown in the FIG. 1a are also referred as MN terminated bearers wherein the PDCP entity of the respective bearers is terminated in the MN 100. For the SCG split DRB, the PDCP entity is terminated in the SN 200 while there are either two legs having respective RLC and MAC entities in the SN 200 and the MN 100 or the lower layer handling i.e. RLC and MAC handling can be only through the MN 100 as shown in the FIG. 1b. The SCG bearer and SCG Split bearer(s) as shown in the FIG. 1B are also referred as SN terminated bearers wherein the PDCP entity of the respective bearers is terminated in the SN 200.

Normally for the MCG Split DRB, the PDCP entity would be LTE PDCP when the MN is LTE and SN is NR. For the SCG Split DRB the PDCP entity would be NR PDCP when the MN is LTE and SN is NR. The MCG Split DRB and SCG Split DRB can be unified such that NR PDCP is used regardless of the PDCP entity anchoring the bearer in the network side, as shown in the FIG. 1c. This would result in for the MCG Split DRB, the PDCP entity NR PDCP when the MN is LTE and SN is NR. For the SCG Split DRB the PDCP entity is NR PDCP when the MN is LTE and SN is NR as shown in FIG. 1c. This is useful to the UE 300 because the PDCP entity is transparent to the UE 300 and only one PDCP i.e NR PDCP is used at the UE side for the UE 300 supporting both LTE and NR interworking based on dual connectivity operation as shown in the FIG. 1c. The UE 300 can be configured with the appropriate security key (i.e. KeNB or S-KgNB) to handle the encryption and integrity protection at the PDCP layer depending on where the PDCP entity is terminating at the network side. If the unified Split DRB is configured (i.e. MCG Split bearer and SCG Split bearer with NR PDCP configured), then from UE 300 perspective PDCP entity is NR PDCP regardless of where the PDCP entity is terminating at the network side provided usage of appropriate security key is configured in the PDCP configuration. The MCG DRB and MCG Split DRB can be supported simultaneously. Further, the SCG DRB and SCG Split DRB can be supported simultaneously. The UE 300 can be configured to support any DRB combination depending on the MN 100 decision. Further if a MCG Split SRB is configured then MCG DRB and SCG DRB can be supported simultaneously. Also, if a SCG SRB is configured then MCG DRB and MCG Split DRB can be supported simultaneously.

The above information is presented as background information only to help the reader to understand the present invention. Applicants have made no determination and make no assertion as to whether any of the above might be applicable as Prior Art with regard to the present application.

SUMMARY

The principal aspect of the embodiments herein is to provide a method and a User Equipment (UE) for handling of integrity check failures of Packet Data Convergence Protocol (PDCP) Protocol Data Units (PDUs) received on radio bearers in a wireless communication system.

Another aspect of the embodiments herein is to perform an integrity check at a PDCP layer on at least one radio bearer based on a Message Authentication. Code-Integrity (MAC-I) of the PDCP PDU.

Another aspect of the embodiments herein is to determine a success of the integrity check of the PDCP PDU and a failure of integrity check of the PDCP PDU received on the radio bearer.

Another aspect of the embodiments herein is to discard the received PDCP for which integrity check is failed.

Another aspect of the embodiments herein is to indicate a Radio Resource Control (RRC) layer about the integrity check failure on the at least one radio bearer in response to determining a trigger condition.

Another aspect of the embodiments herein is to trigger an indication to the RRC layer if integrity check fails continuously/consecutively for a pre-configured number of consecutive PDCP PDUs received on the radio bearer.

Another aspect of the embodiments herein is to indicate the RRC layer about the integrity check failure for the radio bearer is associated with at least one of a Signaling Radio Bearer 1 (SRB1), a SRB2, a SRB3, a Split SRB, a Data Radio Bearer (DRB) and a Split DRB.

Another aspect of the embodiments herein is to handle the integrity check failures detected on a DRB terminated in a Master Node (MN) of dual connectivity mode of operation and a DRB terminated in a serving node of standalone operation.

Another aspect of the embodiments herein is to handle integrity check failures detected on a DRB terminated in a Secondary Node (SN) of dual connectivity mode of operation.

Another aspect of the embodiments herein is to handle integrity check failures detected on a SRB3 terminated in a SN: of dual connectivity mode of operation.

Another aspect of the embodiments herein is to determine whether the PDCP termination point of the split radio bearer is one of: Master Node (MN) and Secondary Node (SN).

Another aspect of the embodiments herein is to handle integrity check failures detected on a Split SRB terminated in a MN of dual connectivity mode of operation.

Another aspect of the embodiments herein is to handle integrity check failures detected on a Split DRB terminated in a MN of dual connectivity mode of operation.

Another aspect of the embodiments herein is to handle integrity check failures detected on a Split DRB terminated in a SN of dual connectivity mode of operation.

Accordingly the embodiments herein provide a method for handling of integrity check failures of Packet Data. Convergence Protocol (PDCP) Protocol Data Units (PDUs) by a User Equipment (UE) in a wireless communication system. The method includes performing an integrity check at a PDCP layer on at least one Radio Bearer based on a Message Authentication Code-Integrity (MAC-I) of the PDCP PDU. The method includes determining a success of integrity check of the PDCP PDU or a failure of integrity check of the PDCP PDU received on the radio bearer. Further, the method includes discarding the PDCP PDU for which integrity is check failed. Furthermore, the method includes indicating a Radio Resource Control (RRC) layer about the integrity check failure on the at least one radio bearer in response to determining a trigger condition.

In an embodiment, performing the integrity check at the PDCP layer includes generating a MAC-I using a configured integrity technique and checking with the received MAC-I in the PDCP PDU.

In an embodiment, the method includes determining the integrity check of the PDCP PDU is successful if the generated MAC-I matches with the received MAC-I. Further, the method includes determining the integrity check of the PDCP PDU is failed if the generated MAC-I does not match with the received MAC-I or the received MAC-I is missed.

In an embodiment, the determination of the trigger condition includes detecting the integrity check failure continuously/consecutively for a pre-configured number of consecutive PDCP PDUs received on the at least one radio bearer.

In an embodiment, the integrity check failed indication to the RRC layer for the radio bearer is associated with at least one of a Signaling Radio Bearer 1 (SRB1), a SRB2, a SRB3, a Split SRB, a Data Radio Bearer (DRB) and a Split DRB.

In an embodiment, the method includes to determine whether the PDCP termination point of the split radio bearer is one of: Master Node (MN) and Secondary Node (SN). Further, the method includes determining the Split radio is terminated in a MN if the security key for handling integrity protection and encryption of the Split radio bearer is associated with MN security key (i.e. KgNB). Further, the method includes determining the Split radio is terminated in a SN if the security key for handling integrity protection and encryption of the Split radio bearer is associated with SN security key (i.e. S-KgNB).

In an embodiment, the radio bearer is a DRB terminated in a Master Node (MN) of dual connectivity mode of operation or a DRB terminated in a serving node of stand-alone operation, the method includes discarding the PDCP PDUs received on the DRB for which the integrity check has failed. The method includes suspending the transmission on the associated DRB in the uplink. Further, the method includes performing at least one of initiating the RRC connection Re-establishment procedure and sending a RRC message to the MN or the serving node indicating the DRB ID for which integrity check failure is determined based on the trigger condition.

In an embodiment, the RRC message indicating the DRB ID for which integrity check is failed is sent on a SRB1 or a SRB2.

In an embodiment, the radio hearer is a DRB terminated in a Secondary Node (SN) of dual connectivity mode of operation, the method includes declaring by the RRC layer, a failure of the SN if integrity check failure for DRB is determined. The method includes discarding the PDCP PDUs received on the DRB for which the integrity check has failed. The method includes suspending the transmission on the associated DRB in the uplink. The method includes sending a SCG failure message to a MN indicating the DRB ID for which integrity check failure is determined or sending a RRC message on SRB3 if configured indicating the DRB ID for which integrity check failure is determined.

In an embodiment, the radio bearer is a SRB3 terminated in a SN of dual connectivity mode of operation, the method includes declaring, by the RRC layer, a failure of the SN if integrity check failure for SRB3 is determined. The method includes suspending the transmission on SRB3 in the uplink. The method includes suspending the transmission on SCG leg of the Split SRB in the uplink if configured. The method includes suspending all the DRBs associated with the SN. Further, the method includes sending a secondary cell group (SCG) failure message to the MN indicating integrity check failure for SRB3 is determined.

In an embodiment, the radio bearer is a Split SRB terminated in a MN of dual connectivity mode of operation, the method includes identifying whether the integrity check failure is due to Master Cell Group (MCG) leg of the Split SRB. Further, the method includes initiating the RRC connection Re-establishment procedure in response to determining that the integrity check failure is due to MCG leg of the Split SRB.

In an embodiment, the radio bearer is a Split SRB terminated in a MN of dual connectivity mode of operation, the method includes identifying whether the integrity check failure is due to SCG leg of the Split SRB. The method includes declaring, by the RRC layer, a failure of the SN if integrity check failure for SCG leg of the Split SRB is determined. The method includes suspending the transmission on SCG leg of Split SRB in uplink. The method includes suspending the transmission on SRB3 in uplink if configured. Further, the method includes suspending the transmission on all the DRBs associated with the SN. Furthermore, the method includes sending a SCG failure message to the MN indicating integrity check failure for Split SRB is determined.

In an embodiment, the Split SRB is at least one of a split SRB1 and a split SRB2.

In an embodiment, the radio bearer is a Split DRB terminated in a MN of dual connectivity mode of operation, the method includes identifying whether the integrity check failure is due to MCG leg of the Split DRB. The method includes discarding the PDCP PDUs received on the MCG leg of the Split DRB for which the integrity check has failed. The method includes suspending the transmission on the MCG leg of the Split DRB in the uplink. Further, the method includes initiating a RRC re-establishment procedure or sending a RRC message on a SRB1 or a. SRB2 indicating the DRB ID of the Split DRB for which integrity check failure is determined.

In an embodiment, the radio bearer is a Split DRB terminated in a MN of dual connectivity mode of operation, the method includes identifying whether the integrity check failure is due to SCG leg of the Split DRB. The method includes discarding the PDCP PDUs received on the SCG leg of the Split DRB for which the integrity check has failed. The method includes suspending the transmission on the SCG leg of the Split DRB in the uplink. Further, the method includes sending a RRC message to the MN on a SRB1 or a SRB2 indicating the DRB ID of Split DRB for which integrity check failure is determined, or sending a SCG failure message to the MN indicating the DRB ID of the Split DRB for which integrity checked failure is determined.

In an embodiment, the radio bearer is a Split DRB terminated in a SN of dual connectivity mode of operation, the method includes identifying whether the integrity check failure is due to MCG leg of the Split DRB. The method includes discarding the PDCP PDUs received on the MCG leg of the Split DRB for which the integrity check has failed. The method includes suspending the transmission on the MCG leg of the Split DRB in the uplink. Further, the method includes sending a RRC message a SRB1 or a SRB2 indicating the DRB ID of the Split DRB for which integrity check failure is determined, or sending a RRC message on a SRB3 if configured indicating the DRB ID of Split DRB for which integrity check failure is determined.

In an embodiment, the radio bearer is a Split DRB terminated in a SN of dual connectivity mode of operation, the method includes identifying whether the integrity check failure is due to SCG leg of the Split DRB. The method includes discarding the PDCP PDUs received on the SCG leg of the Split DRB for which the integrity check has failed. The method includes suspending the transmission on the SCG leg of the Split DRB in the uplink. Further, the method includes sending a SCG failure message to the MN indicating the DRB ID of the Split DRB for which integrity checked failure is determined, or sending a RRC message to the SN on SRB3 if configured, indicating the DRB ID of the Split DRB for which integrity check failure is determined.

Accordingly the embodiments herein provide a User Equipment (UE) for handling of integrity check failures of Packet Data Convergence Protocol (PDCP) Protocol Data Units (PDUs) in a wireless communication system. The UE is configured to perform an integrity check at a PDCP layer on at least one radio bearer based on a Message Authentication Code-Integrity (MAC-I) of the PDCP PDU. The UE is configured to determine one of a success of integrity check of the PDCP PDU and a failure of integrity check of the PDCP PDU received on the radio bearer. Further, the UE is configured to discard the PDCP PDU for which integrity check is failed. Furthermore, the UE is configured to indicate a Radio Resource Control (RRC) layer about the integrity check failure on the at least one radio bearer in response to determining a trigger condition.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
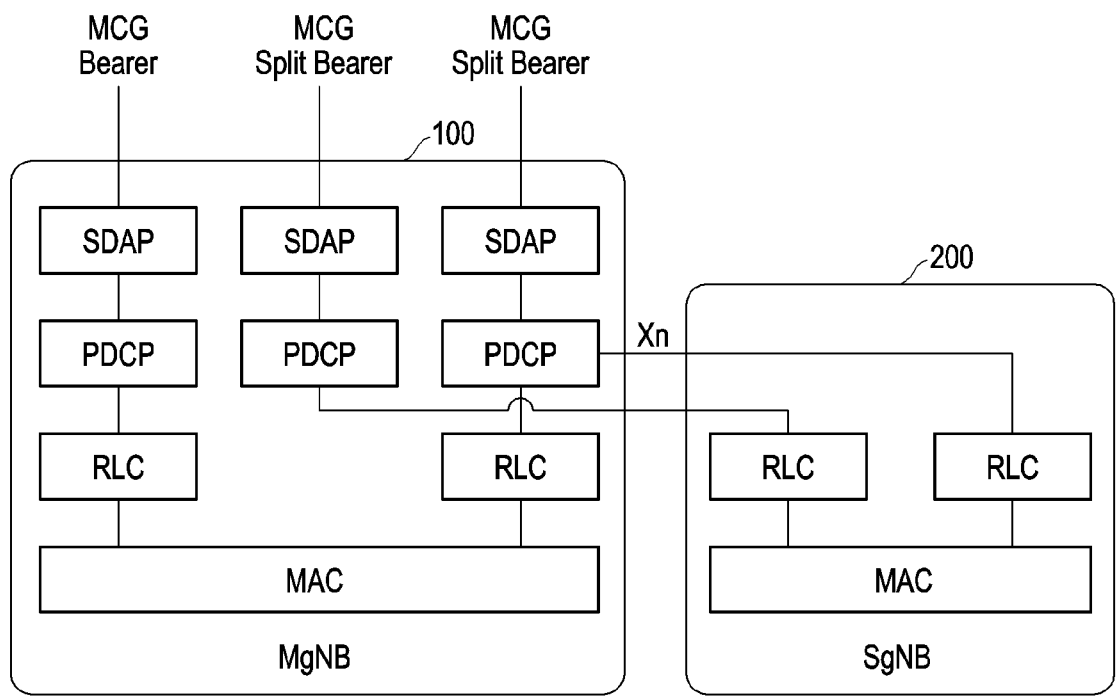
FIG. 1a is a block diagram illustrating an example that a PDCP entity is terminated in a master node for a MCG split DRB.
Figure 1B:
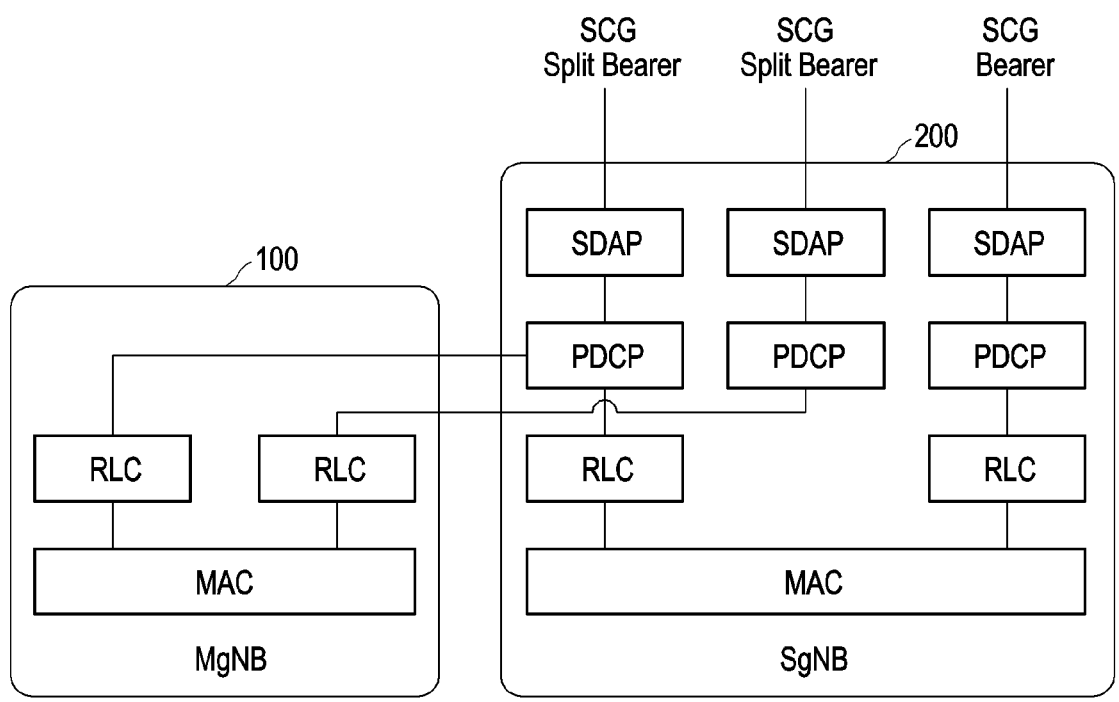
FIG. 1b is a block diagram illustrating an example that a PDCP entity is terminated in a secondary node for a SCG split DRB.
Figure 1C:
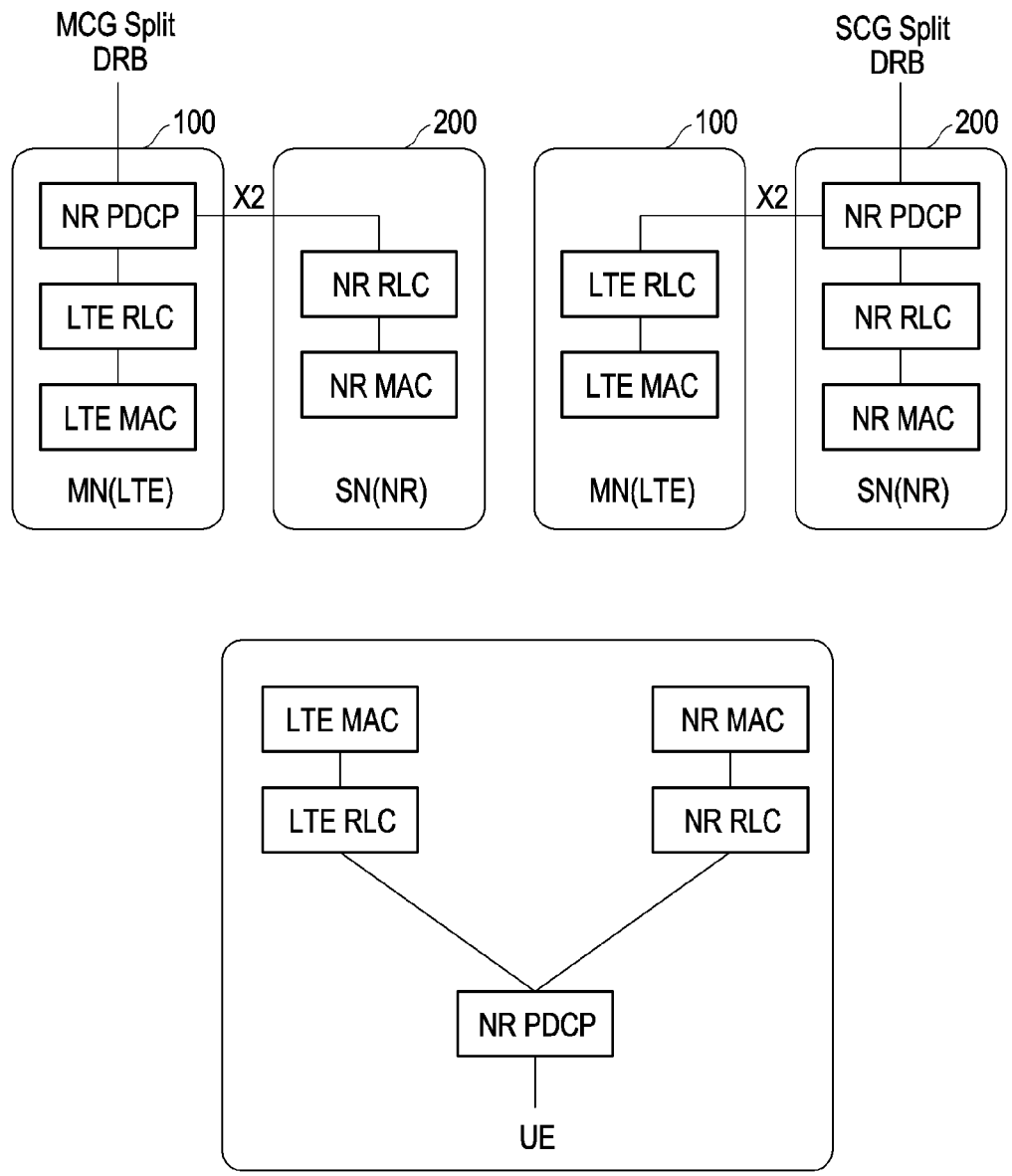
FIG. 1c is a block diagram illustrating an example that MCG Split DRB and SCG Split DRB can be unified

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, the following details are described for better understanding of the embodiments of the present disclosure.

a. "Signaling Radio Bearers" (SRBs) are defined as Radio Bearers (RB) that are used only for the transmission of RRC and Non Access Stratum (NAS) messages. In LTE and NR interworking, the following SRBs are defined: SRB0 is for RRC messages using the CCCH logical channel in MN i.e. MCG SRB. For eg. RRC connection request message or RRC Connection Resume Request message is sent on SRB0.

b. SRB1 is for RRC messages (which may include a piggybacked NAS message) as well as for NAS messages prior to the establishment of SRB2, all using DCCH logical channel in MN i.e. MCG SRB. For e.g. RRC Connection Setup message or RRC Connection Resume message is sent on SRB1.

c. SRB2 is for RRC messages which include logged measurement information as well as for NAS messages, all using DCCH logical channel in MN. SRB2 has a lower-priority than SRB1 and is always configured by RAN after security activation i.e. MCG SRB.

d. SRB3 is for RRC messages which may include measurement configuration after the establishment of SRB2, all using DCCH logical channel in SN i.e., SCG SRB.

There is no integrity protection and ciphering for SRB0. This means the PDCP entity is by-passed for SRB0. Once security is activated, all RRC messages on SRB1 and SRB2, including those containing NAS or non-3GPP messages, are integrity protected and ciphered by PDCP entity in MN. NAS independently applies integrity protection and ciphering to the NAS messages. For a UE configured with dual connectivity for LTE and NR interworking, all RRC messages from the MN, regardless of the SRB used and both in downlink and uplink, are sent by the MN on the MCG SRB. If SCG SRB is configured then all RRC messages from the SN both in downlink and uplink are sent by the SN on the SCG SRB. If the SCG SRB is not configured then all RRC messages from the SN both in downlink and uplink, are transferred via the MN on the MCG SRB.

The integrity protection technique is common for signaling radio bearers SRB1 and SRB2. However for SRB3 the integrity protection technique may be the same as SRB1 and SRB2 or different. The ciphering technique is common for all radio bearers (i.e. SRB1, SRB2) and DRBs associated with MN. The ciphering technique for SRB3 i.e. SCG SRB may be the same as MCG SRB (i.e. SRB1 and SRB2) or different. The ciphering technique for SCG DRB may be the same as MCG DRB or different. The integrity protection technique for SCG DRB may be the same as MCG DRB or different. Neither integrity protection nor ciphering applies for SRB0. RRC integrity and ciphering are always activated together, i.e. in one message/procedure. RRC integrity and ciphering are never de-activated. However, it is possible to switch to a 'NULL' ciphering technique (eea0). It is also possible to switch to a 'NULL' integrity protection technique. It is also possible that ciphering technique is not set to 'NULL' while the integrity protection technique is set to 'NULL'. The Access Stratum (AS) applies four different security keys: one for the integrity protection of RRC signaling (KRRCint), one for the ciphering of RRC signaling (KRRCenc), one for the ciphering of user plane data (KUPenc) and one for the integrity protection of user plane data (KUPint). All four AS keys are derived from the KeNB key or KgNB key of the respective node. The KgNB related to the MN is based on the KASME key, which is handled by upper layers. The KgNB related to SN i.e. S-KgNB is derived from the KgNB using a uniqueness parameter.

Accordingly the embodiments herein provide a method for handling of integrity check failures of PDCP PDUs in a wireless communication system. The method includes performing an integrity check at the PDCP layer on at least one Radio Bearer based on a Message Authentication Code-Integrity (MAC-I) of the PDCP PDU. The method includes determining one of a success of integrity check of the PDCP PDU and a failure of integrity check of the PDCP PDU received on the radio bearer. Further, the method includes discarding the PDCP PDU for which integrity check is failed. Furthermore, the method includes indicating a Radio Resource Control (RRC) layer about the integrity check failure on the at least one radio bearer in response to determining a trigger condition.

The proposed method and system can be used to handle integrity check failure scenarios on radio bearers such as a Signaling Radio Bearer 1 (SRB1), a SRB2, a SRB3, a Split SRB, a Data Radio Bearer (DRB) and a Split DRB in the fifth generation wireless communication system.

The following integrity check failure scenarios as shown in Table I are handled and the UE behavior and actions are specified when such scenarios are detected. The behavior and action(s) is also applicable, when the network identifies the integrity check failure scenarios as listed in Table I.

TABLE 1

| Sr. No | Integrity check failure scenarios |
| --- | --- |
| 1 | Integrity check failure on MCG SRB |
| 2 | Integrity check failure on SCG SRB |
| 3 | Integrity check failure on MCG split SRB |
| 4 | Integrity check failure on MCG DRB |
| 5 | Integrity check failure on SCG DRB |
| 6 | Integrity check failure on MCG split DRB |
| 7 | Integrity check failure on SCG split DRB |
| 8 | Integrity check failure on unified split DRB |

Referring now to the drawings, and more particularly to FIGS. 2a through 9, there are shown preferred embodiments.

Figure 2A:
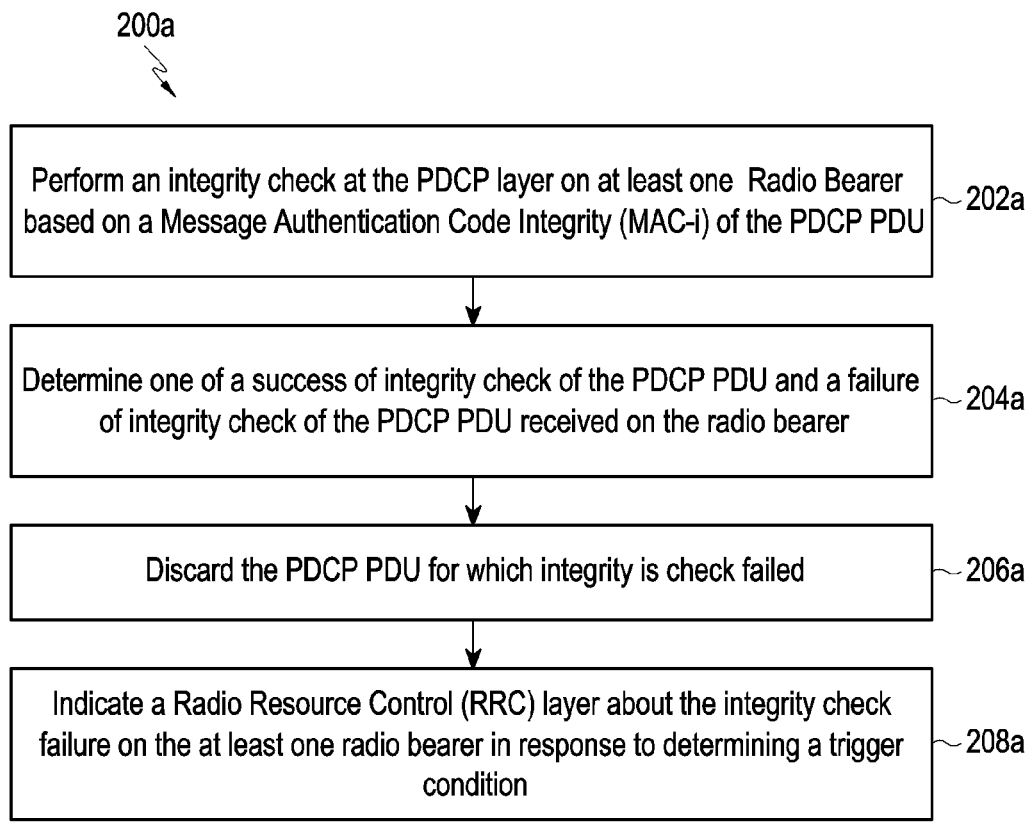
FIG. 2a is a flow diagram illustrating a method for handling integrity check failures of PDCP PDUs by a User Equipment (LE) in a wireless communication system, according to an embodiment as disclosed herein.

FIG. 2a is a flow diagram 200a illustrating a method for handling integrity check failures of PDCP PDUs by a User Equipment (UE) 300 in a wireless communication system, according to an embodiment as disclosed herein.

At step 202a, the method includes performing an integrity check at a PDCP layer on at least one radio bearer based on a Message Authentication Code-Integrity (MAC-I) of the PDCP PDU. The UE 300 is configured to perform the integrity check at the PDCP layer on at least one Radio Bearer based on the MAC-I of the PDCP PDU.

At step 204a, the method includes determining a success of integrity check of the PDCP PDU or a failure of integrity check of the PDCP PDU received on the radio bearer. The UE 300 is configured to determine a success of integrity check of the PDCP PDU or a failure of integrity check of the PDCP PDU received on the radio bearer.

At step 206a, the method includes discarding the PDCP PDU for which the integrity check is failed. The UE 300 is configured to discard the PDCP PDU for which the integrity check is failed.

At step 208a, the method includes indicating a RRC layer about the integrity check failure on the at least one radio bearer in response to determining a trigger condition. The UE 300 is configured to indicate the RRC layer about the integrity check failure on the at least one radio bearer in response to determining a trigger condition.

In an embodiment, the determination of trigger condition includes detecting the integrity check failure continuously/consecutively for a pre-configured number of consecutive PDCP PDUs received on the radio bearer. For example, the pre-configured number of consecutive PDCP PDUs can be n==10, and can be configured by the network.

The various actions, acts, blocks, steps, or the like in the flow chart 200a may be performed in the order presented, in a different order or simultaneously. Further, in some embodiments, some of the actions, acts, blocks, steps, or the like may be omitted, added, modified, skipped, or the like without departing from the scope of the invention.

Figure 2B:
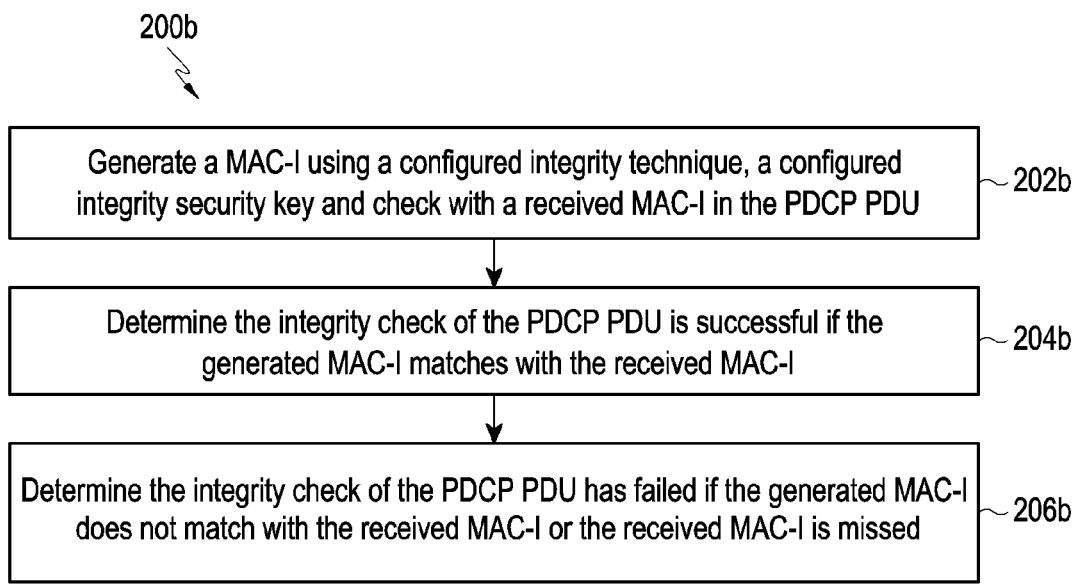
FIG. 2b is a flow diagram illustrating a method for performing an integrity check at the PDCP layer by the UE, according to an embodiment as disclosed herein.

FIG. 2b is a flow diagram 200b illustrating a method for performing an integrity check at the PDCP layer by the UE 300, according to an embodiment as disclosed herein. At step 202b, the method includes generating a MAC-I using a configured integrity technique, a configured integrity security key and checking with a received MAC-I in the PDCP PDU. The UE 300 is configured to generate the MAC-I using a configured integrity technique, a configured integrity security key and check with the received MAC-I in the PDCP PDU.

At step 204b, the method includes determining the integrity check of the PDCP PDU is successful if the generated MAC-I matches with the received MAC-I. The UE 300 is configured to determine the integrity check of the PDCP PDU is successful if the generated MAC-I matches with the received MAC-I.

At step 206b, the method includes determining the integrity check of the PDCP PDU has failed if the generated MAC-I does not match with the received MAC-I or the received MAC-I is missed. The UE 300 is configured to determine the integrity check of the PDCP PDU has failed if the generated MAC-I does not match with the received MAC-I or the received MAC-I is missed.

The various actions, acts, blocks, steps, or the like in the flow chart 200b may be performed in the order presented, in a different order or simultaneously. Further, in some embodiments, some of the actions, acts, blocks, steps, or the like may be omitted, added, modified, skipped, or the like without departing from the scope of the invention.

Figure 2C:
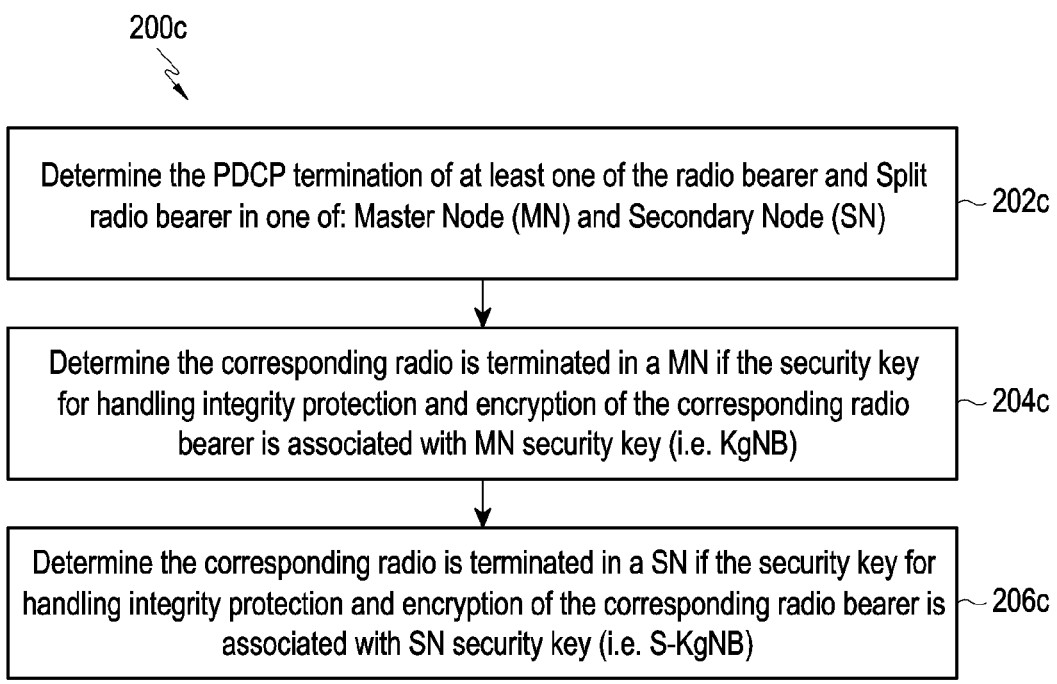
FIG. 2c is a flow diagram illustrating a method for determining whether the PDCP termination point for a radio bearer or a Split radio bearer is one of Master Node (MN) or Secondary Node (SN), according to an embodiment as disclosed herein.

FIG. 2c is a flow diagram 200c illustrating a method for determining whether the PDCP termination point for a radio bearer or a Split radio bearer is one of: Master Node (MN) 100 or Secondary Node (SN) 100, according to an embodiment as disclosed herein. At step 202c, the method includes determination of the PDCP termination of the radio bearer or a Split radio bearer is one of: Master Node (MN) and Secondary Node (SN). The UE 300 is configured to determine whether the PDCP termination point for a radio bearer or Split radio bearer is one of: Master Node (MN) or Secondary Node (SN).

At step 204c, the method includes determining the PDCP layer of the corresponding radio bearer is terminated in a Master Node (MN) if the security key for handling integrity protection and encryption of the corresponding radio bearer is associated with the MN security key (i.e. KgNB). The UE 300 is configured to determine the corresponding radio bearer is terminated in a Master Node (MN) if the security key for handling integrity protection and encryption of the corresponding radio bearer is associated with the MN security key (i.e. KgNB).

At step 206c, the method includes determining the PDCP layer of the corresponding radio bearer is terminated in a Secondary Node (SN) if the security key for handling integrity protection and encryption of the corresponding radio bearer is associated with the SN security key (i.e. S-KgNB). The UE 300 is configured to determine the corresponding radio bearer is terminated in a Secondary Node (SN) if the security key for handling integrity protection and encryption of the corresponding radio bearer is associated with the SN security key (i.e., S-KgNB).

When the integrity check is failed, the various embodiments described herein can be used to handle the integrity check failures on PDCP PDUS on radio bearer(s). The following flow diagrams describe the various embodiments for detecting and handling the integrity check failures of the PDCP PDUs received on the radio bearer(s). It should be noted that the embodiments described herein are provided for handling the integrity check failures detected on Signaling Radio Bearers such as SRB1, SRB2, SRB3, Split SRBs, Data Radio Bearers (DRBs) and Split DRBs.

Integrity Check Failure on MCG SRB i.e., SRB1 or SRB2:

The UE 300 at the PDCP layer detects integrity check failure for RRC messages transmitted on MCG SRB based on incorrect or missing message authentication code-Integrity (MAC-I). The Integrity check is failed (or not successful) if the received MAC-I in the PDCP PDU does not match with the generated MAC-I or the received MAC-I is missed. When integrity check failure is detected on MCG SRB (i.e., SRB1 or SRB2) from the MN 100 i.e., MCG SRB, then the PDCP layer informs RRC layer about the failure and the RRC layer initiates the RRC Connection Re-establishment procedure. The RRC message or PDCP PDU on which integrity check is failed is discarded.

In an embodiment, the PDCP layer detects integrity check failure on SRB1 and/or SRB2 i.e., MCG SRB. Further, the PDCP layer indicates the failure to the RRC layer which leads to initiation of the RRC Connection Re-establishment procedure.

In an embodiment, the PDCP layer declares MCG SRB failure, only if a pre-configured (n) consecutive number of integrity checks failure of the PDCP PDUs. The value of n (for example, n==5) can be decided by the network and indicated to the UE 300. In an embodiment, if the PDCP layer do not need to declares MCG SRB failure, then value of n can be set to highest PDCP COUNT value (i.e., n=232+1) or more than highest PDCP COUNT value.

Figure 3:
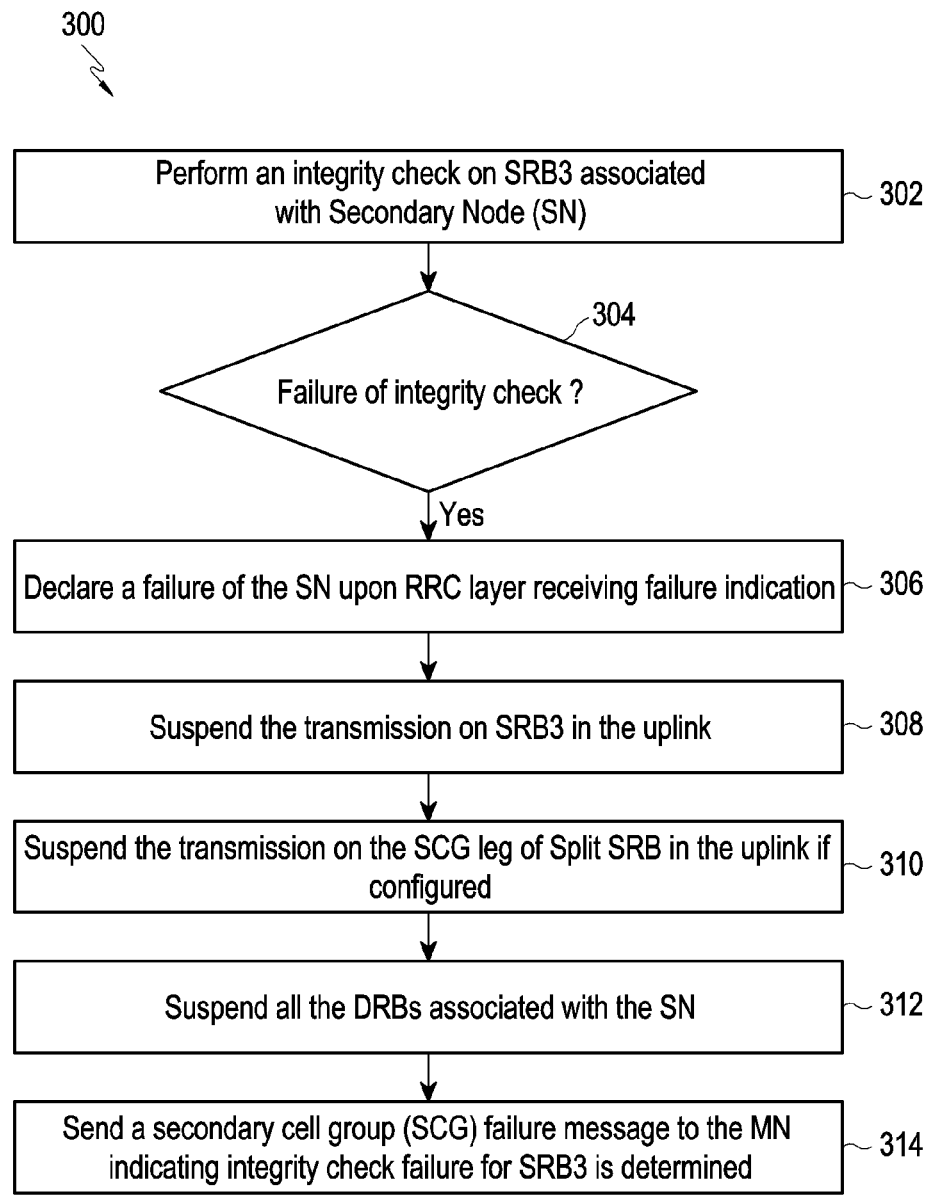
FIG. 3 is a flow diagram illustrating a method for handling integrity check failure detected on SRB3 associated with a Secondary Node (SN), according to an embodiment as disclosed herein.

Integrity Check Failure on SCG SRB i.e., SRB3:

FIG. 3 is a flow diagram 300 illustrating a method for handling integrity check failure detected on SRB3 associated with a Secondary Node (SN) 200, according to an embodiment as disclosed herein.

In an embodiment, if SCG SRB is configured, the UE 300 may at PDCP layer detects integrity check failure for RRC messages transmitted on the SCG SRB based on wrong or incorrect or missing message authentication code-integrity (MAC-I). The Integrity check is failed (or not successful), if the received MAC-I in the PDCP PDU does not match with the MAC-I generated by UE. When integrity check failure is detected on SRB (i.e. SRB3) from the SN i.e. SCG SRB, then the PDCP layer informs RRC about the failure, and the RRC layer declares SgNB or SCG or SN failure. The PDCP PDU or RRC message on which integrity check is failed is discarded. The various steps of the flow diagram 300 are detailed below.

At step 302, the method includes performing an integrity check on SRB3 associated with the SN 200 at the PDCP layer based on a MAC-I of the PDCP PDU. The UE 300 is configured to perform the integrity check on the SRB3 associated with the SN 200 at the PDCP layer based on the MAC-I of the PDCP PDU.

At step 304, the method includes determining the failure of the integrity check if the generated MAC-I does not match with the received MAC-I or the received MAC-I is missed. The UE 300 is configured to determine the failure of the integrity check if the generated MAC-I does not match with the received MAC-I or the received MAC-I is missed. At step 306, the method includes declaring by the RRC layer a failure of the SN 200 upon RRC layer receiving SCG SRB failure indication. The UE 300 is configured to declare the failure of the SN 200 upon RRC layer receiving SCG failure indication.

At step 308, the method includes suspending the transmission on the SCG SRB in the uplink. The UE 300 is configured to suspend the transmission on the SCG SRB in the uplink.

At step 310, the method includes suspending the transmission on the SCG leg of Split SRB in the uplink if configured. The UE 300 is configured to suspend the transmission on the SCG leg of Split SRB in the uplink.

At step 312, the method includes suspending all the DRBs associated with the SN 200. This includes suspending SCG transmission on the SCG leg of the MCG split DRBs if configured, Further, it includes suspend SCG transmission on the SCG leg of the SCG split DRBs if configured The UE 300 is configured to suspend all the DRBs associated with the SN 200. The UE 300 is configured to suspend SCG transmission on the SCG leg of the MCG split DRBs and SCG split DRB.

At step 314, the method includes sending a secondary cell group (SCG) failure message to the MN 100 indicating integrity check failure for SRB3 i.e. SCG SRB is determined. The UE 300 is configured to send the SCG failure message to the MN 100 indicating integrity check failure for SRB3 i.e. SCG SRB is determined.

The following actions are performed by the UE RRC upon declaring SgNB (or SCG) or SN failure other than the actions mentioned above:

a. direct SCG SRB and suspend SCG transmission on the SCG leg of the MCG split SRB;
b. SCG transmission on the SCG leg of the MCG split DRBs;
c. Suspend SCG transmission on the SCG leg of the SCG split DRBs;
d. SCG-MAC;

The various actions, acts, blocks, steps, or the like in the flow chart 200b may be performed in the order presented, in a different order or simultaneously. Further, in some embodiments, some of the actions, acts, blocks, steps, or the like may be omitted, added, modified, skipped, or the like without departing from the scope of the invention.

Figure 4:
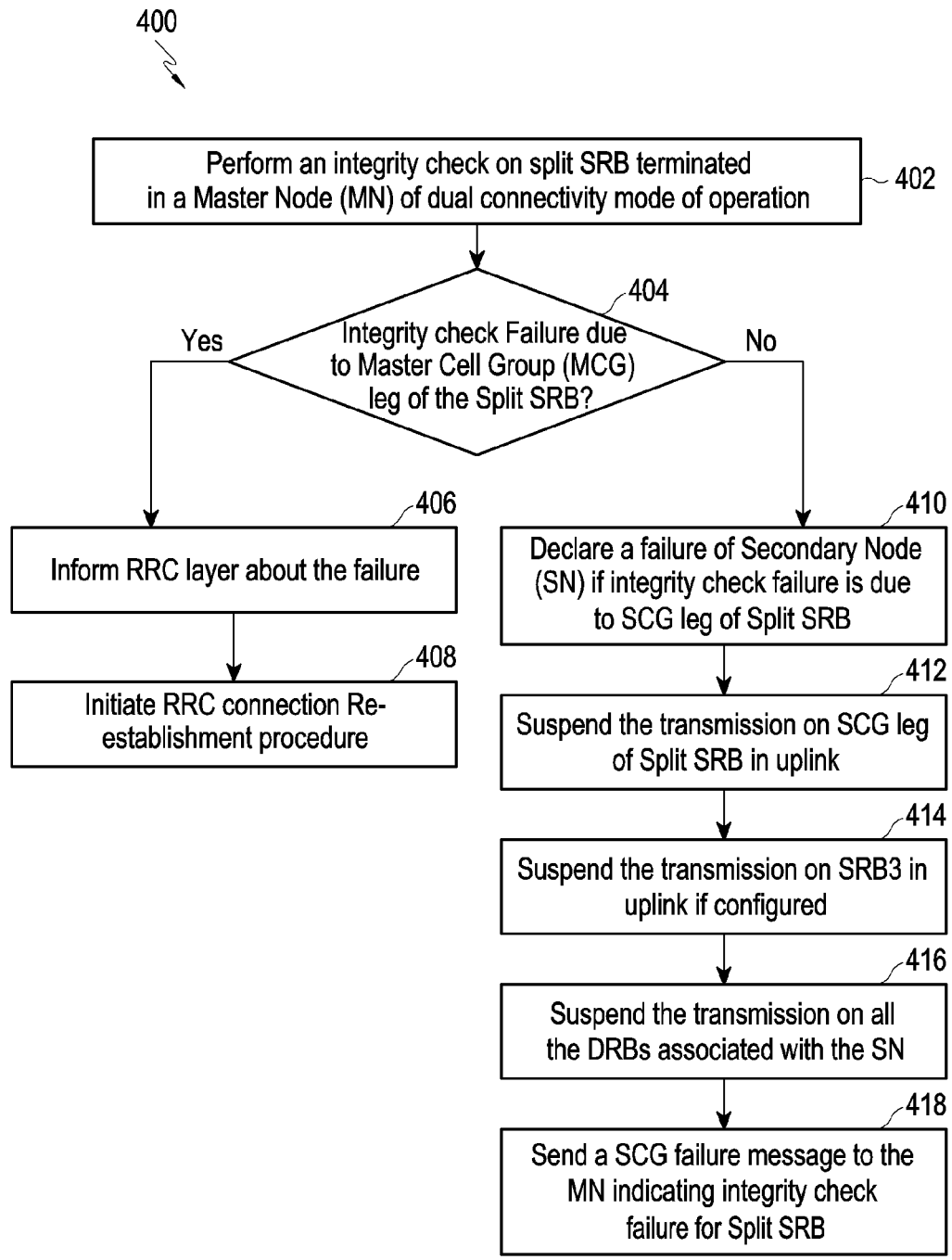
FIG. 4 is a flow diagram illustrating a method for handling integrity check failure detected on split SRB1 and/or split SRB2 associated with a Master Node (MN), according to an embodiment as disclosed herein.

Integrity Check Failure on MCG Split SRB i.e. SRB1 or SRB2:

FIG. 4 is a flow diagram 400 illustrating a method for handling integrity check failure on split SRB1 and/or split SRB2 associated with a Master Node (MN), according to an embodiment as disclosed herein.

In an embodiment, if MCG Split SRB is configured, the UE 300 may at PDCP layer detect integrity check failure for RRC messages transmitted on MCG Split SRB based on wrong or incorrect or missing message authentication code-integrity (MAC-I). The integrity check is failed (or not successful) if the received MAC-I in PDCP PDU does not match with the MAC-I generated by the UE 300. When integrity check failure is detected on Split SRBs (i.e. SRB1 or SRB2) from the MN i.e. MCG Split SRBs or MN terminated SRBs, then the PDCP layer informs the RRC layer about the failure and the RRC layer initiates the RRC Connection Re-establishment procedure. The PDCP PDU or RRC message on which integrity check fails is discarded.

The various steps of the flow diagram 400 are as detailed below.

At step 402, the method includes performing an integrity check on split SRB (split SRB1 and/or split SRB2) terminated in the MN 100 of dual connectivity mode of operation. The UE 300 is configured to perform an integrity check on split SRB terminated in the MN 100 of dual connectivity mode of operation. The UE 300 is configured to determine the Split SRB is terminated in the MN based on the flow diagram 200c of FIG. 2c.

At step 404, the method includes identifying whether the integrity check failure is due to Master Cell Group (MCG) leg of the of Split SRB. The UE 300 is configured to identify whether the integrity check failure is due to MCG leg of the Split SRB. The MCG leg refers to the logical channel between RLC entity and MAC entity in the MN 100.

In an embodiment, the UE 300 is configured to identify whether the integrity check failure is due to RLC SDU coming from the MCG leg or the SCG leg of the MCG Split SRB. The SCG leg refers to the logical channel between RLC entity and MAC entity in the SN 100. Depending on from which RLC entity the PDCP PDU on which MAC-I failed was received, the UE 300 at the PDCP layer can determine on which leg the packet injection attack has occurred. For example, if the PDCP PDU on which the MAC-I is failed was received from SCG RLC entity, then packet injection attack has occurred on SCG leg and if the PDCP PDU on which MAC-I failed was received from MCG RLC entity, then packet injection attack has occurred on MCG leg.

If it is identified that the integrity check failure is due to the MCG leg of the Split SRB, then at step 406, the method includes indicating the RRC layer of the failure on the MCG leg of the Split SRB. The UE 300 is configured wherein the RRC layer receives indication of the failure on the MCG leg of the Split SRB.

At step 408, the method includes initiating a RRC connection Re-establishment procedure. The UE 300 is configured to initiate the RRC connection Re-establishment procedure.

In case, if it is identified that the integrity check failure is due to the SCG leg of the Split SRB, then at step 410, the method includes declaring a failure of the SN 200. The UE 300 is configured to declare the failure of the SN 200 if it is identified that the integrity check failure is due to the SCG leg of the Split SRB.

At step 412, the method includes suspending the transmission on SCG leg of Split SRB in uplink. The UE 300 is configured to suspend the transmission on SCG leg of Split SRB in uplink.

At step 414, the method includes suspending the transmission on SCG SRB i.e. SRB3 in uplink if configured. The UE 300 is configured to suspend the transmission on SCG SRB i.e. SRB3 in uplink.

At step 416, the method includes suspending the transmission on all the DRBs associated with the SN 200. This includes suspending SCG transmission on the SCG leg of the MCG split DRBs if configured, Further, it includes suspend SCG transmission on the SCG leg of the SCG split DRBs if configured. The HE 300 is configured to suspend the transmission on all the DRBs associated with the SN 200. The UE 300 is configured to suspend SCG transmission on the SCG leg of the MCG split DRBs and SCG split DRB.

At step 418, the method includes sending a SCG failure message to the MN 100 indicating integrity check failure for Split SRB. The UE 300 is configured to send the SCG failure message to the MN 100 indicating integrity check failure for the Split SRB.

The various actions, acts, blocks, steps, or the like in the flow chart 400 may be performed in the order presented, in a different order or simultaneously. Further, in some embodiments, some of the actions, acts, blocks, steps, or the like may be omitted, added, modified, skipped, or the like without departing from the scope of the invention.

Figure 5A:
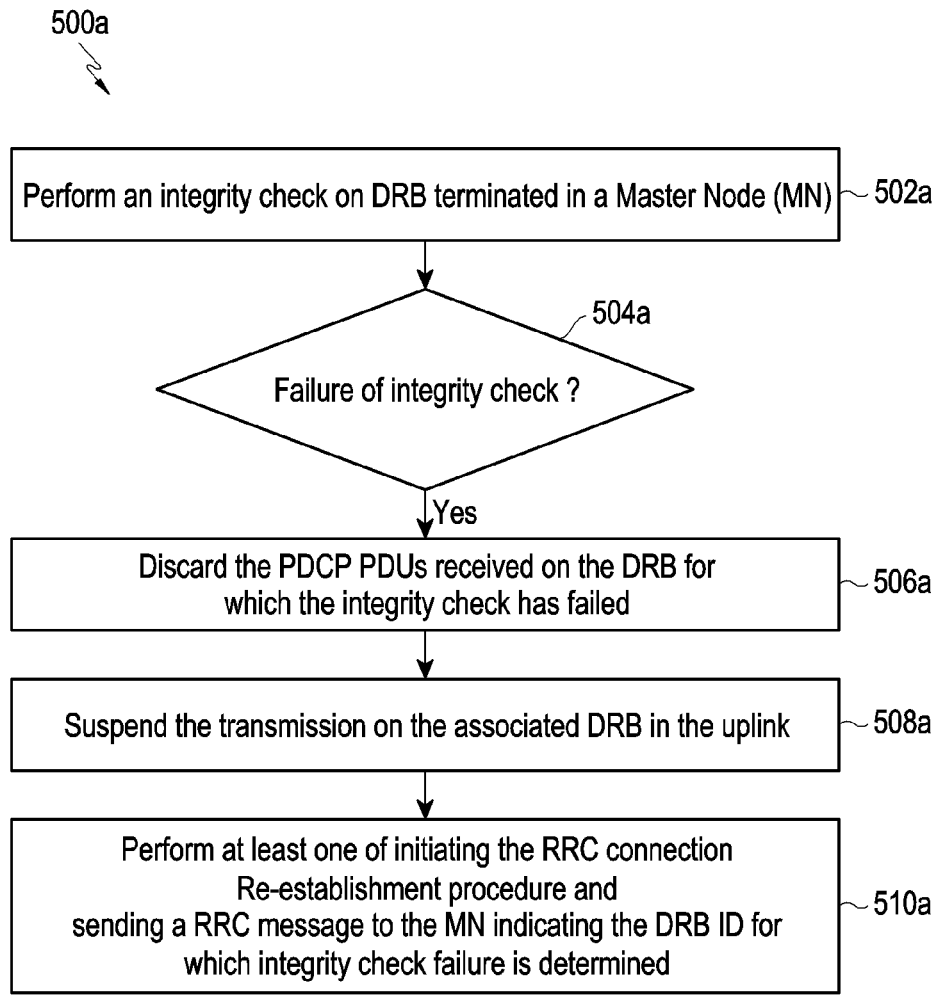
FIG. 5a is a flow diagram illustrating a method for handling integrity check failure detected on a DRB terminated in the MN of dual connectivity mode of operation, according to the embodiments as disclosed herein.
Figure 5B:
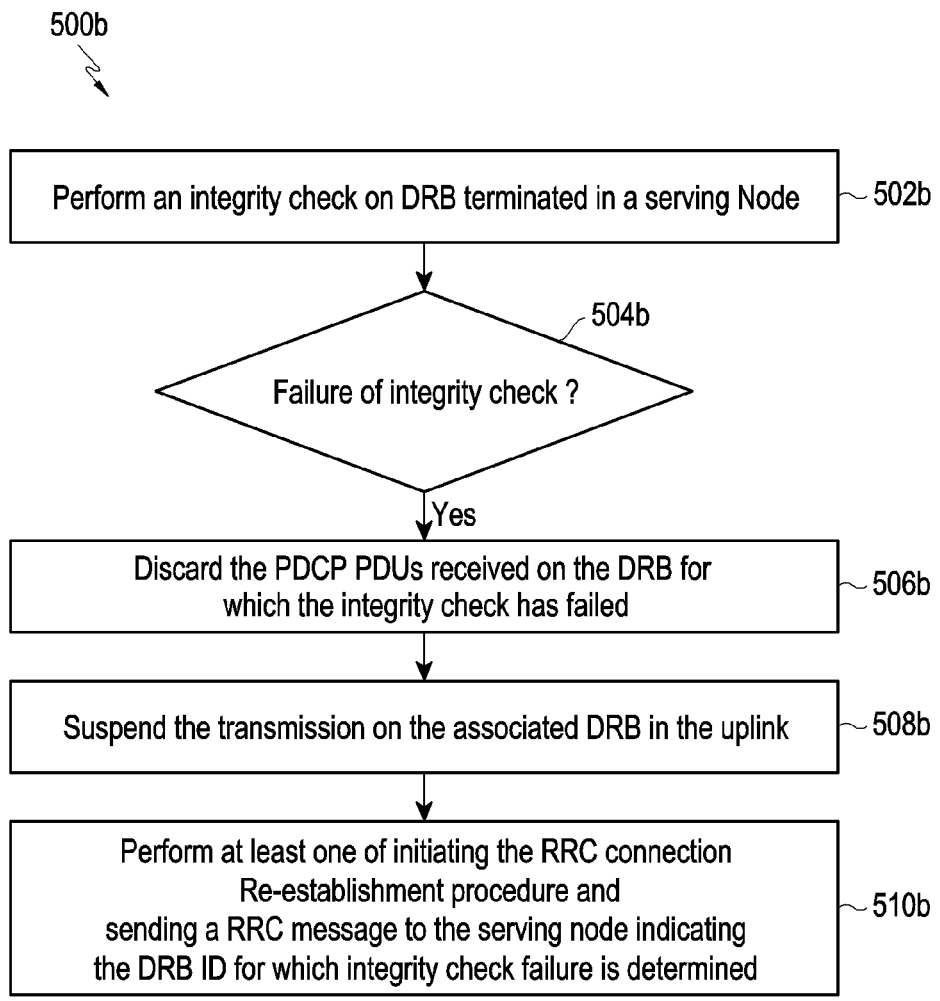
FIG. 5b is a flow diagram illustrating a method for handling integrity check failure detected on a DRB terminated in a serving node of the UE in standalone operation, according to the embodiments as disclosed herein.

FIGS. 5*a* and 5*b* are a flow diagrams 500*a* and 500*b* illustrating a method for handling integrity check failure on a DRB associated with a M 100, according to the embodiments as disclosed herein.

Integrity check failure on MCG DRB: In an embodiment, if on MCG DRB, the integrity protection is configured and upon detecting integrity check failure on DRB established on the MN 100 i.e., MCG DRB, the UE 300 checks the number of PDCP PDUs for which the integrity check has failed continuously/consecutively. For example, the UE 300 can maintain INTEGRITY_CHK_FAIL_COUNTER for each DRB for which integrity protection is configured. The INTEGRITY_CHK_FAIL_COUNTER is set to zero when the DRB is established. INTEGRITY_CHK_FAIL_COUNTER is set to zero when the integrity check passes for a PDCP PDU of corresponding DRB. INTEGRITY_CHK_FAIL_COUNTER is incremented by one when integrity check fails for a PDCP PDU of corresponding DRB (within the PDCP COUNT window). If the number of PDCP PDUs for which MAC-I fails continuously/consecutively is below a threshold (or INTEGRITY_CHK_FAIL_COUNTER <threshold), then. PDCP layer just discards the PDCP PDU. The threshold can be pre-defined or signaled (e.g. in PDCP configuration) by network. If the number of PDCP PDUs for which MAC-I fails continuously/consecutively is above or equal to a threshold (or INTEGRITY_CHK_FAIL_COUNTER >=threshold), then PDCP discards the PDCP PDU, suspends the DRB, informs RRC layer about failure, and RRC send a. RRC message indicating integrity failure to MN 100. The UE 300 includes in RRC message indicating integrity failure, the DRB ID of the DRB on which integrity is failed to the MN 100. The MN 100 signals the UE 300 to re-establish the affected DRB or all DRBs with security key (i.e. KeNB/KgNB) refresh. Alternately, if the number of PDCP PDUs for which MAC-I fails continuously/consecutively (for a PDCP COUNT, which is greater than the last successfully integrity checked PDCP COUNT or which is within the PDCP COUNT window) is above a threshold (or INTEGRITY_CHK_FAIL_COUNTER >=threshold), then PDCP discards the PDCP PDU, suspends the DRB, then PDCP sends a PDCP control PDU indicating integrity failure to MN. MN signals the UE to re-establish the affected DRB or all DRBs with security key (i.e. KeNB) refresh. If integrity check failure is detected on one MCG DRB where the number of PDCP PDUs for which MAC-I fails continuously/consecutively is above a threshold, while other MCG DRBs there is no integrity check failure, then if security key need to be refreshed for affected MCG DRB which is re-established then all unaffected MCG DRBs need to be re-established since security key is common for all DRBs. If security key is per DRB (if a unique key for each established DRB is used), then ($K_{UPint}$) and ($K_{UPenc}$) of the affected MCG DRB can be refreshed and only the affected MCG DRB is re-established. This avoids PDCP re-establishment of unaffected MCG DRBs and to an extent prevents denial of service attack on all unaffected DRBs.

In another embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (or INTEGRITY_CHK_FAIL_COUNTER <threshold), then PDCP just discards the PDCP PDU. The threshold can be pre-defined or signaled (e.g. in PDCP configuration) by network. If the number of PDCP PDUs for which MAC-I fails is above or equal to a threshold (or INTEGRITY_CHK_FAIL_COUNTER >=threshold), then PDCP discards the PDCP PDU, PDCP informs to RRC layer about failure, and the RRC layer sends a RRC message indicating integrity failure to MN 100. The UE includes in RRC message indicating integrity failure, the DRB ID of the DRB on which integrity is failed to the MN 100. The MN 100 signals the UE 100 to re-establishes the affected DRB or all DRBs with security key (i.e. KeNB) refresh. Alternately, if the number of PDCP PDUs for which MAC-I fails is above a threshold (or INTEGRITY_CHK_FAIL_COUNTER>= threshold), then PDCP discards the PDCP PDU, then PDCP sends a PDCP control PDU indicating integrity failure to MN. MN signals the UE to re-establish the affected DRB or all DRBs with security key (i.e. KeNB) refresh.

In an Embodiment, Only the Affected DRB is Reestablished:

If on MCG DRB integrity protection is configured and upon detecting integrity check failure on DRB established on MN 100 i.e., MCG DRB, the PDCP layer discards the PDCP PDU on which integrity check is failed, suspends the affected DRB, PDCP informs to RRC layer about failure, and the RRC layer sends a RRC message indicating integrity failure to MN. UE includes in RRC message indicating integrity failure, the DRB ID of the DRB on which integrity is failed to the MN 100. The MN 100 signals the UE to re-establish only the affected DRB.

In another embodiment, the PDCP layer discards the PDCP PDU on which integrity check is failed and then PDCP sends a PDCP control PDU indicating integrity failure to the MN 100. The MN 100 signals the UE 300 to re-establish the affected DRB. If the integrity check failure is detected on one MCG DRB while other MCG DRBs there is no integrity check failure, then if security key need to be refreshed for affected MCG DRB which is re-established, then all unaffected MCG DRBs need to be re-established if security key is common for all DRBs. If security key is per DRB, then (KUPint) and (KUPenc) of the affected MCG DRB can be refreshed and only the affected MCG DRB is re-established. This avoids PDCP re-establishment of unaffected MCG DRBs. The UE 300 actions for integrity check failure can be based on N consecutive packet failure (i.e. INTEGRITY_CHK_FAIL_COUNTER >=threshold) or based N packets which failed but are not contiguous.

In an embodiment, the UE performs RRC Re-establishment procedure: If on MCG DRB integrity protection is configured and upon detecting integrity check failure on DRB established on MN 100 i.e., MCG DRB, then check the number of PDCP PDUs for which the MAC-I fails continuously/consecutively. For example, UE can maintain INTEGRITY_CHK_FAIL_COUNTER for each DRB for which integrity protection is configured. The INTEGRITY_CHK_FAIL_COUNTER is set to zero when DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB. If the number of PDCP PDUs for which MAC-I fails continuously/consecutively is below a threshold (or INTEGRITY_CHK_FAIL_COUNTER <threshold), then PDCP just discards the PDCP PDU. If the number of PDCP PDUs for which MAC-I fails continuously/consecutively is above or equal to a threshold (INTEGRITY_CHK_FAIL_COUNTER >=threshold), then PDCP discards the PDCP PDU, PDCP informs to RRC about failure, and RRC re-establishes the connection. The threshold can be pre-defined or signaled (e.g. in PDCP configuration) by network.

In another embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (or INTEGRITY_CHK_FAIL_COUNTER <threshold), then the PDCP layer just discards the PDCP PDU. If the number of PDCP PDUs for which MAC-I fails is above or equal to a threshold (INTEGRITY_CHK_FAIL_COUNTER>= threshold), then the PDCP layer discards the PDCP PDUs, and the PDCP layer informs to RRC layer about failure, and RRC re-establishes the connection. The threshold can be pre-defined or signaled (e.g. in PDCP configuration) by network.

In another embodiment, if on MCG DRB integrity protection is configured and upon detecting integrity check failure on DRB established on MN 100 i.e., MCG DRB, the PDCP layer discards the PDCP PDUs on which integrity check is failed and then the PDCP layer informs to RRC layer about failure, and RRC re-establishes the connection. In this case there is no threshold based criteria or the threshold is set to 1 for the PDCP to take action on detecting integrity check failure.

In an embodiment, the UE discards the PDCP PDUs of affected DRB and indicated to M 100: If on MCG DRB integrity protection is configured and upon detecting integrity check failure on DRB established on MN 100 i.e., MCG DRB, PDCP layer simply keeps discarding the PDCP PDUs for which integrity check failure is determined. The PDCP layer informs to RRC layer about failure, and the RRC layer sends a RRC message indicating integrity check failure to the MN 100. The HE 300 includes in RRC message indicating integrity failure, the DRB ID of the DRB on which integrity is failed to the MN. The UE 300 does not suspend the affected DRB autonomously but wait for the action from gNB after sending the RRC message. In this case the threshold based criteria can be specified such that the threshold >=1 for the PDCP to take action on detecting integrity check failure. The gNB action can be to release the affected DRB or re-establish the affected DRB or release the UE RRC connection.

The above mentioned details are presented as steps in the flow diagram 500a. The various steps of the flow diagram 500a are detailed below.

At step 502a, the method includes performing an integrity check on DRB terminated in the MN 100 of dual connectivity mode of operation. The UE 300 is configured to determine the DRB is terminated in MN according to the flow diagram 200c of FIG. 2c. The UE 300 is configured to perform the integrity check on the DRB terminated in the MN 100 of dual connectivity mode of operation.

At step 504a, the method includes identifying the integrity check failure on the DRB terminated in the MN 100. The PDCP layer declares MCG DRB integrity check failure, only if a pre-configured (n) consecutive number of integrity check failure of the received PDCP PDUs occurs and indicates to RRC. The value of n (for example, n==5) can be decided by the network and indicated to the UE 300. The UE 300 is configured to identify the integrity check failure on the DRB terminated in the MN 100. The UE 300 is configured to declare MCG DRB integrity check failure, only if a pre-configured (n) consecutive number of integrity check failure of the PDCP PDUs occurs.

At step 506a, the method includes discarding the PDCP PDUs received on the DRB for which the integrity check has failed. The UE 300 is configured to discard the PDCP PDUs received on the DRB for which the integrity check has failed.

At step 508a, the method includes suspending the transmission on the associated DRB in the uplink. The UE 300 is configured to suspend the transmission on the associated DRB in the uplink.

At step 510a, the method includes either initiating the RRC connection Re-establishment procedure or sending a RRC message to the MN 100 indicating the DRB ID for which integrity check failure is determined. The UE 300 is configured to either initiate the RRC connection Re-establishment procedure or send a RRC message to the MN 100 indicating the DRB ID for which integrity check failure is determined.

In some embodiments, if the UE 300 (the PDCP layer) detects integrity check failure on DRB associated with MN 100 i.e. MCG DRB, the UE identifies the cause of the failure and inform the failure to the RRC layer along with the cause which may either lead to initiation of the RRC Connection Re-establishment procedure or PDCP re-establishment for the affected DRB or suspension of the affected DRB and sending RRC message to the MN 100 indicating the identified cause. The MN 100 action can be to release the affected DRB or to re-establish the affected DRB or release the UE RRC connection.

The details related to identification of cause(s) are as detailed below.

In an embodiment, the reason/cause for the integrity check failure is identified: The UE 300 is configured to identify the reason/cause for the integrity check failure. In this embodiment, action taken is determined based on reason/cause of integrity check failure. Integrity check failure due to context mismatch i.e. key mismatch will not only affect the established DRBs but also the SRBs (since all the keys are derived from the root/master key (KgNB/KeNB), in such situation UE RRC can trigger RRC Connection re-establishment procedure for context matching. Integrity check failure due to context mismatch i.e. mismatch will only affect the established DRB for which the HFN is de-synchronized but other established DRBs and the SRBs are not affected, in such situation UE RRC can trigger PDCP re-establishment of the affected DRB for context matching. However, if integrity check failure is not due to context mismatch i.e. key mismatch or HFN mismatch, the RRC connection re-establishment is not useful because the problem may be due to packet injection attack. Even after RRC connection re-establishment or PDCP re-establishment of the affected DRB the problem may persists. The reason/cause for integrity check failure can be identified by the UE. In case of key mismatch the faulty MAC-I will be generated for all established DRBs and SRB. In case of HEN mismatch the faulty MAC-I will be generated for the affected DRB. In case of packet injection attack, the MAC-I will be missing or includes a garbage MAC-I for dummy PDCP PDUs introduced by the intruder while the MAC-I check will pass for the PDCP PDUs transmitted by the genuine transmitter. This puts a requirement on the UE PDCP to identify the cause of integrity check failure. Depending on the cause UE either initiate the RRC connection re-establishment procedure or UE can indicate to MN to re-establish PDCP of the affected MCG DRB using RRC message including the cause value associated with HFN mismatch or UE simply keep discarding the PDCP PDUs with missing/failed MAC-I, suspends the affected DRB and indicate to MN the affected MCG DRB using RRC message including the cause value associated with missing/failed MAC-I.

If integrity check failure due to packet injection when the number of PDCP PDUs for which MAC-I fails continuously/consecutively (i.e. missing MAC-I) is above a threshold, then PDCP informs to RRC about failure and RRC can trigger DRB re-establishment with security key (i.e. KeNB) refresh. However, even after PDCP re-establishment and key refresh for the affected DRB, if the integrity check failure problem continues then RRC can indicate to MN of the affected MCG DRB using RRC message including the cause value associated with missing MAC-I. Depending on the cause value the network will either re-establish the PDCP with refreshed security key or simply release the UE RRC connection if the cause value is related to packet injection problem.

In another embodiment, if the integrity check failure due to packet injection when the number of PDCP PDUs for which MAC-I fails continuously/consecutively is above a threshold, then PDCP informs to RRC about failure and RRC can trigger RRC Connection re-establishment procedure.

The various actions, acts, blocks, steps, or the like in the flow chart 500*a* may be performed in the order presented, in a different order or simultaneously. Further, in some embodiments, some of the actions, acts, blocks, steps, or the like may be omitted, added, modified, skipped, or the like without departing from the scope of the invention.

FIG. 5*b* is a flow diagram 500*b* illustrating a method for handling integrity check failure on a DRB terminated in a serving node, according to the embodiments as disclosed herein.

At step 502*b*, the method includes performing an integrity check on DRB terminated in a serving node of standalone operation. The UE 300 is configured to perform the integrity check on the DRB terminated in the serving node of standalone operation. The serving node can be a gNB or an eNB.

At step 504*b*, the method includes identifying the integrity check failure on the DRB terminated in a serving node. The PDCP layer declares DRB integrity check failure, only if a pre-configured (n) consecutive number of integrity check failure of the received PDCP PDUs occurs and indicates to RRC. The value of n (for example, n==5) can be decided by the network and indicated to the UE 300. The UE 300 is configured to identify the integrity check failure on the DRB terminated in the serving node. The UE 300 is configured to declare DRB integrity check failure, only if a pre-configured (n) consecutive number of integrity check failure of the received PDCP PDUs occurs.

At step 506*b*, the method includes discarding the PDCP PDUs received on the DRB for which the integrity check has failed. The UE 300 is configured to discard the PDCP PDUs received on the DRB for which the integrity check has failed.

At step 508*b*, the method includes suspending the transmission on the associated DRB in the uplink. The UE 300 is configured to suspend the transmission on the associated DRB in the uplink.

At step 510*b*, the method includes performing at least one of initiating the RRC connection Re-establishment procedure and sending a RRC message to the serving node for which integrity check failure is determined. The UE 300 is configured to perform at least one of initiating the RRC connection Re-establishment procedure and sending a RRC message to the serving node indicating the DRB ID for which integrity check failure is determined.

The various actions, acts, blocks, steps, or the like in the flow chart 500*b* may be performed in the order presented, in a different order or simultaneously. Further, in some embodiments, some of the actions, acts, blocks, steps, or the like may be omitted, added, modified, skipped, or the like without departing from the scope of the invention.

Figure 6:
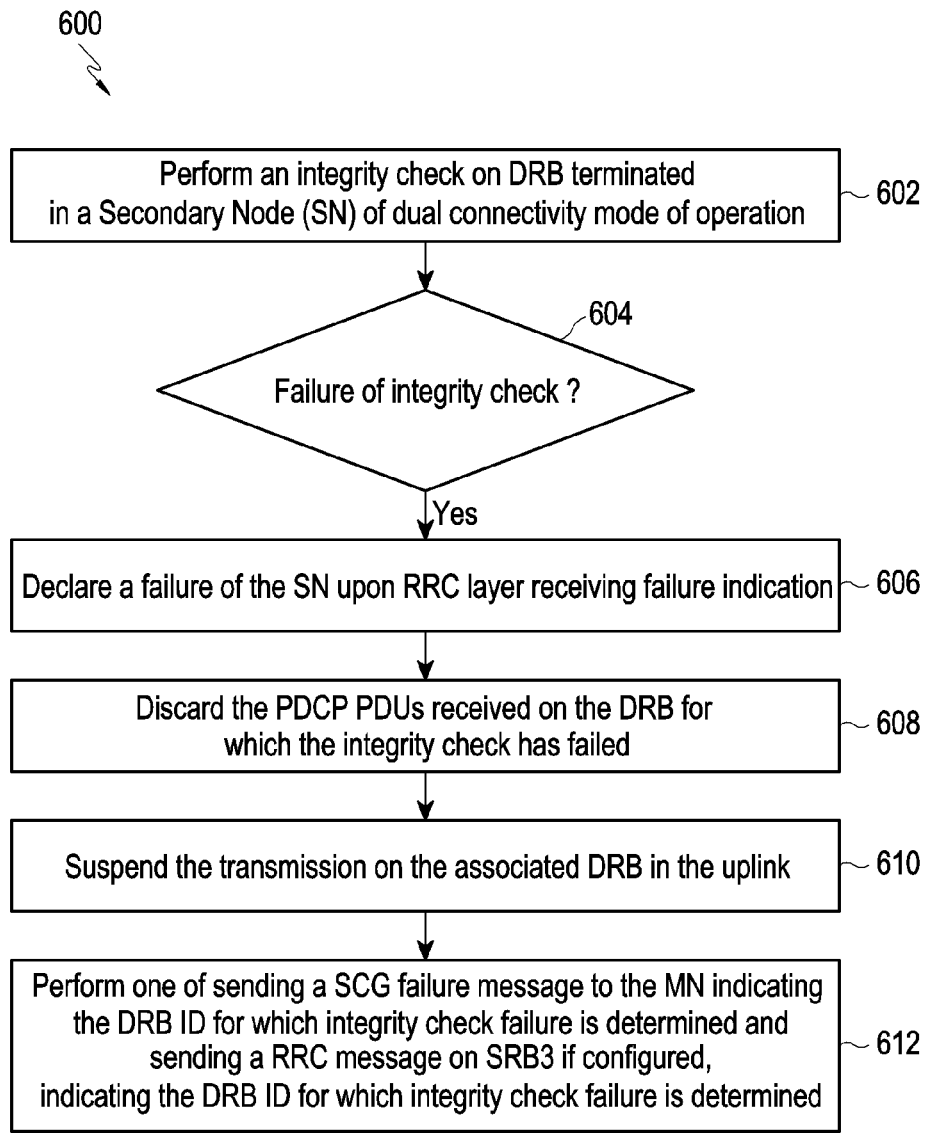
FIG. 6 is a flow diagram illustrating a method for handling integrity check failure detected on a DRB associated with the SN, according to the embodiments as disclosed herein.

FIG. 6 is a flow diagram 600 illustrating a method for handling integrity check failure on DRB associated with SN, according to the embodiments as disclosed herein. The UE 300 is configured to determine the DRB is terminated in SN according to the flow diagram 200*c* of FIG. 2*c*.

In an embodiment, all DRBs are re-established: If on SCG DRB integrity protection is configured and upon detecting integrity check failure on DRB established on SN 200 i.e., SCG DRBs, then UE check the number of PDCP PDUs for which the MAC-I fails continuously/consecutively. For example, UE 300 can maintain INTEGRITY_CHK_FAIL_COUNTER for each DRB for which integrity protection is configured. The INTEGRITY_CHK_FAIL_COUNTER is set to zero when DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB. If the number of PDCP PDUs for which MAC-I fails continuously/consecutively is below a threshold (INTEGRITY_CHK_FAIL_COUNTER <Threshold), then PDCP layer discards the PDCP PDU. The threshold can be pre-defined or signaled (e.g. in PDCP configuration) by network. If the number of PDCP PDUs for which MAC-I fails continuously/consecutively is above a threshold (INTEGRITY_CHK_FAIL_COUNTER >=threshold), then the PDCP layer discards the PDCP PDUs, suspends the affected DRB, PDCP layer informs RRC about failure, and the RRC layer sends a RRC message indicating integrity failure at SN 200 to the MN 100. The UE includes in RRC message indicating integrity failure, the DRB ID of the DRB on which integrity check failure is determined to the MN 100. The MN or SN signals the UE 300 to re-establish the affected SCG DRB or all SCG DRBs with security key (i.e. S-KgNB) refresh. In an embodiment, if the number of PDCP PDUs for which MAC-I fails continuously/consecutively (for a PDCP COUNT, which is greater than the last successfully integrity checked PDCP COUNT or which is within the PDCP COUNT window) is above a threshold (INTEGRITY_CHK_FAIL_COUNTER >=threshold), then the PDCP layer discards the PDCP PDU, suspends the affected DRB, then the PDCP layer sends a PDCP control PDU indicating integrity failure to SN 200. The SN 200 signals the UE 300 to re-establish the affected DRB or all DRBs with security key (i.e. S-KgNB) refresh. If integrity check failure is detected on one SCG DRB where the number of PDCP PDUs for which MAC-I fails continuously/consecutively is above a threshold, while other SCG DRBs there is no integrity check failure, then if security key need to be refreshed for affected SCG DRB which is re-established then all unaffected SCG DRBs need to be re-established since security key is common for all DRBs. If security key is per DRB, then ($K_{UPint}$) and ($K_{UPenc}$) of the affected SCG DRB can be refreshed and only the affected SCG DRB is re-established. This avoids PDCP re-establishment of unaffected SCG DRBs.

In another embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (INTEGRITY_CHK_FAIL_COUNTER <Threshold), then PDCP just discards the PDCP PDU. The threshold can be pre-defined or signaled (e.g. in PDCP configuration) by network. If the number of PDCP PDUs for which MAC-I fails is above a threshold (INTEGRITY_CHK_FAIL_COUNTER >=threshold), then the PDCP layer discards the PDCP PDU, suspends the affected DRB, PDCP layer informs to RRC layer about failure, and the RRC layer sends a RRC message indicating integrity failure at SN 200 to MN 100. The UE 300 includes in RRC message indicating the integrity failure, the DRB ID of the DRB on which integrity check failure is determined to the MN 100. The MN 100 or SN 200 signals the UE 300 to re-establish the affected SCG DRB or all SCG DRBs with security key (i.e. KeNB) refresh. Alternately, if the number of PDCP PDUs for which MAC-I fails is above a threshold (INTEGRITY_CHK_FAIL_COUNTER >=threshold), then PDCP discards the PDCP PDU, then PDCP sends a PDCP control PDU indicating integrity failure to SN. SN signals the UE to re-establish the affected DRB or all DRBs with security key (i.e. KeNB) refresh.

In an embodiment, only the affected DRB is re-established: If on SCG DRB integrity protection is configured and upon detecting integrity check failure on DRB established on the SN 200 i.e., SCG DRB, the PDCP layer discards the PDCP PDU on which integrity check is failed, suspend the affected DRB, the PDCP layer informs to RRC layer about failure, and RRC layer sends a RRC message indicating integrity failure at SN 200 to the MN 100. The UE 300 includes in RRC message indicating integrity failure, the DRB ID of the DRB on which integrity check failure is determined, to the MN 100. The MN 100 or SN 200 signals the UE 300 to re-establish only the affected SCG DRB. Alternately, the PDCP layer discards the PDCP PDU on which integrity check is failed, the PDCP layer sends a PDCP control PDU indicating integrity failure to SN 200. The SN 200 signals the UE 300 to re-establish only the affected SCG DRB. If integrity check failure is detected on one SCG DRB while other SCG DRBs there is no integrity check failure (INTEGRITY_CHK_FAIL_COUNTER <threshold) then if security key need to be refreshed for affected SCG DRB which is re-established then all unaffected SCG DRBs need to be re-established since security key is common for all DRBs. If security key is per SCG DRB, then ($K_{UPint}$) and ($K_{UPenc}$) of the affected SCG DRB can be refreshed and only the affected SCG DRB is re-established. This avoids PDCP re-establishment of unaffected SCG DRBs. The UE actions for integrity check failure can be based on N consecutive packet failure (i.e. INTEGRITY_CHK_FAIL_COUNTER >=threshold) or based N packets which failed but are not contiguous.

In an embodiment, the UE RRC layer declares SCG failure: If on SCG DRB integrity protection is configured and upon detecting integrity check failure on DRB established on SN 200 i.e., SCG DRB, then UE 300 checks the number of PDCP PDUs for which the MAC-I fails continuously/consecutively. For example, the UE 300 can maintain INTEGRITY_CHK_FAIL_COUNTER for each DRB for which integrity protection is configured. The INTEGRITY_CHK_FAIL_COUNTER is set to zero when DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB (within the PDCP COUNT window). If the number of PDCP PDUs for which MAC-I fails continuously/consecutively is below a threshold (INTEGRITY_CHK_FAIL_COUNTER <Threshold), then PDCP just discards the PDCP PDU. The threshold can be pre-defined or signaled (e.g. in PDCP configuration) by network. If the number of PDCP PDUs for which MAC-I fails continuously/consecutively (for a PDCP COUNT, which is greater than the last successfully integrity checked PDCP COUNT or which is within the PDCP COUNT window) is above a threshold (INTEGRITY_CHK_FAIL_COUNTER >=threshold), then the PDCP layer discards the PDCP PDU, PDCP informs to RRC layer about failure, and RRC declare SgNB (or SCG) failure and send a RRC message indicating integrity failure at SN to MN. Following actions are performed by the UE RRC upon declaring SgNB (or SCG) failure:

a. Suspend direct SCG SRB and suspend SCG transmission on the SCG leg of the MCG split SRB;
b. Suspend all SCG DRBs;
c. Suspend SCG transmission on the SCG leg of the MCG split DRBs;
d. Suspend SCG transmission on the SCG leg of the SCG split DRBs;
e. Reset SCG-MAC;
f. Send the SCGFailureInformation message to the MN with corresponding cause value (i.e. integrity check failure).

In an alternate embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (INTEGRITY_CHK_FAIL_COUNTER <Threshold), then PDCP just discards the PDCP PDU. The threshold can be pre-defined or signaled (e.g. in PDCP configuration) by network. If the number of PDCP PDUs for which MAC-I fails is above a threshold (INTEGRITY_CHK_FAIL_COUNTER >=threshold), then PDCP discards the PDCP PDU, then PDCP indicates to RRC about failure, and RRC declare SgNB (or SCG) failure and send a RRC message indicating integrity failure at the SN 200 to the MN 100. Following actions are performed by the UE RRC upon declaring SgNB (or SCG) failure:

a) Suspend direct SCG SRB and suspend SCG transmission on the SCG leg of the MCG split SRB;
b) Suspend all SCG DRBs;
c) Suspend SCG transmission on the SCG leg of the MCG split DRBs;
d) Suspend SCG transmission on the SCG leg of the SCG split DRBs;
e) Reset SCG-MAC;
f) Send the SCGFailureInformation message to the MN with corresponding cause value (i.e. integrity check failure).

In yet another embodiment, if on SCG DRB integrity protection is configured and upon detecting integrity check failure on. DRB established on SN 200 i.e., SCG DRB, PDCP discards the PDCP PDU, PDGF informs to RRC about failure, and RRC declare SgNB (or SCG) failure and send a RRC message indicating integrity failure at SN to MN. In this case there is no threshold based criteria or the threshold is set to 1 for the PDCP to take action on detecting integrity check failure. Following actions are performed by the UE RRC upon declaring SgNB (or SCG) failure:

a) Suspend direct SCG SRB and suspend SCG transmission on the SCG leg of the MCG split SRB;
b) Suspend all SCG DRBs;
c) Suspend SCG transmission on the SCG leg of the MCG split DRBs;
d) Suspend SCG transmission on the SCG leg of the SCG split DRBs;
e) Reset SCG-MAC;
f) Send the SCGFailureInformation message to the MN with corresponding cause value (i.e. integrity check failure).

In an embodiment, the UE 300 discards the PDCP PDUs of affected DRB and inform to MN 100 or SN 100: If SCG DRB is configured and integrity protection is enabled on SCG DRB, upon detecting integrity check failure on SCG DRB, then check the number of PDCP PDUs for which the MAC-I fails continuously/consecutively. If the number of PDCP PDUs for which MAC-I fails continuously/consecutively or not contiguous is below a threshold, then the PDCP layer discards the PDCP PDUs of the SCG DRB. If the number of PDCP PDUs for which MAC-I fails continuously/consecutively or not contiguous is above a threshold, the PDCP layer informs RRC layer and the RRC layer can trigger to send the RRC message to the MN 100 or SN 200 with corresponding cause values (i.e. integrity check failure). The UE 300 can indicate to SN 200 the problem for affected SCG DRB using RRC message sent on SCG SRB in UL or PDCP control PDU. The UE 300 includes in RRC message indicating integrity failure, the DRB ID of the DRB on which integrity check failure is determined to the MN 100 or SN 200. The UE 300 does not suspend the affected DRB autonomously but wait for the action from SN 200 (i.e., gNB) after sending the RRC message. In this case the threshold based criteria can be specified such that the threshold >=1 for the PDCP to take action on detecting integrity check failure. The MN or SN action can be to release the affected DRB or re-establish the affected DRB or release the SCG.

The above mentioned details are presented as steps in the flow diagram 600. The various steps of the flow diagram 600 are detailed below.

At step 602, the method includes performing the integrity check on DRB terminated in the SN 200 of dual connectivity mode of operation. The UE 300 is configured to perform the integrity check on the DRB terminated in the SN 200 of dual connectivity mode of operation.

At step 604, the method includes identifying whether there is an integrity check failure of the PDCP PDU received on DRB terminated in the SN 200. The PDCP layer declares SCG DRB integrity check failure, only if a pre-configured (n) consecutive number of integrity check failure of the received PDCP PDUs occurs and indicates to RRC. The value of n (for example, n==5) can be decided by the network and indicated to the UE 300. The UE is configured to identify whether there is an integrity check failure of the PDCP PDU received on the DRB terminated in the SN 200. The UE 300 is configured to declare SCG DRB integrity check failure, only if a pre-configured (n) consecutive number of integrity check failure of the received PDCP PDUs occurs.

At step 606, the method includes declaring SN failure or SCG failure or SgNB failure upon RRC layer receiving SCG DRB failure indication. The UE 300 is configured to declare SN failure upon RRC layer receiving SCG DRB failure indication.

At step 608, the method includes discarding the PDCP PDUs received on the DRB for which the integrity check has failed. The UE 300 is configured to discard the PDCP PDUs received on the DRB for which the integrity check has failed.

At step 610, the method includes suspending the transmission on the associated DRB in the uplink. The UE 300 is configured to suspend the transmission on the associated DRB in the uplink.

At step 612, the method includes either sending a SCG failure message to the MN 100 indicating the DRB ID for which integrity check failure is determined or sending a RRC message on SRB3 if configured, indicating the DRB ID for which integrity check failure is determined. The UE 300 is configured to either send a SCG failure message to the MN 100 indicating the DRB ID for which integrity check failure is determined or send a RRC message on SRB3 if configured, indicating the DRB ID for which integrity check failure is determined.

In some embodiments, if the UE 300 (PDCP layer) detects integrity check failure on DRB associated with SN i.e., SCG DRB then the UE 300 identifies the cause of the failure, informs the failure to RRC layer along with the cause which may either lead to declaration of SgNB failure or PDCP re-establishment for the affected DRB or suspension of the affected SCG DRB and sending RRC message to the MN indicating the identified cause. The gNB action can be to release the affected SCG DRB or re-establish the affected SCG DRB or release the SCG.

In an embodiment, the UE 300 identifies the reason/cause for the integrity, check failure: In this embodiment, action taken is determined based on cause of integrity check failure. The integrity check failure due to context mismatch i.e. key mismatch will not only affect the established SCG DRBs but also the SCG SRB i.e. SRB3, in such situation the USE RRC can declare SgNB failure and trigger to send SCGFailureInformation message to the MN 100 with corresponding cause value (i.e. integrity check failure due to key mismatch). The integrity check failure due to context mismatch i.e. HEN mismatch will only affect the established SCG DRB for which the HFN is de-synchronized but other established SCG DRBs and the SRB3 are not affected, in such situation UE RRC can trigger PDCP re-establishment of the affected SCG DRB for context matching. However, if integrity check failure is not due to context mismatch i.e. key mismatch or HFN mismatch, the UE RRC can declare SgNB failure and trigger to send SCGFailureInformation message to the MN with corresponding cause value (i.e. integrity check failure due to packet injection). The cause for integrity check failure can be identified by the UE. In case of key mismatch the faulty MAC-I will be generated for all established SCG DRBs and SRB3. In case of HFN mismatch the faulty MAC-I will be generated for the affected SCG DRB. In case of packet injection attack, the MAC-I will be missing or includes a garbage MAC-I for dummy PDCP PDUs introduced by the intruder while the MAC-I check will pass for the PDCP PDUs transmitted by, the genuine transmitter. This puts a requirement on the UE PDCP to identify the cause of integrity check failure. Depending on the cause UE 300 either declare SgNB failure and initiate to send SCGFailureInformation message to the MN 100 with corresponding cause value or UE 300 can indicate to MN 100 or SN 200 to re-establish PDCP of the affected SCG DRB using RRC message including the cause value associated with HFN mismatch or the UE 300 discards the PDCP PDUs with missing MAC-I, suspend the affected DRB and indicate to MN 100 the affected SCG DRB using RRC message including the cause value associated with missing MAC-I.

If integrity check failure is due to packet injection when the number of PDCP PDUs for which MAC-I fails continuously (i.e. missing MAC-I) is above a threshold, then PDCP informs to RRC about failure and RRC can trigger DRB re-establishment with security key (i.e. S-KgNB) refresh. However, even after PDCP re-establishment and key refresh for the affected DRB, if the integrity check failure problem continues then RRC can indicate to MN of the affected SCG DRB using RRC message including the cause value associated with missing MAC-I. Depending on the cause value the network will either re-establish the PDCP with refreshed security key or simply release the SCG if the cause value is related to packet injection problem.

In another embodiment, if integrity check failure due to packet injection when the number of PDCP PDUs for which MAC-I fails continuously/consecutively is above a threshold, then PDCP informs to RRC about failure and RRC can declare SCG failure and send SCGFailureInformation message to the MN with corresponding cause value.

The various actions, acts, blocks, steps, or the like in the flow chart 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
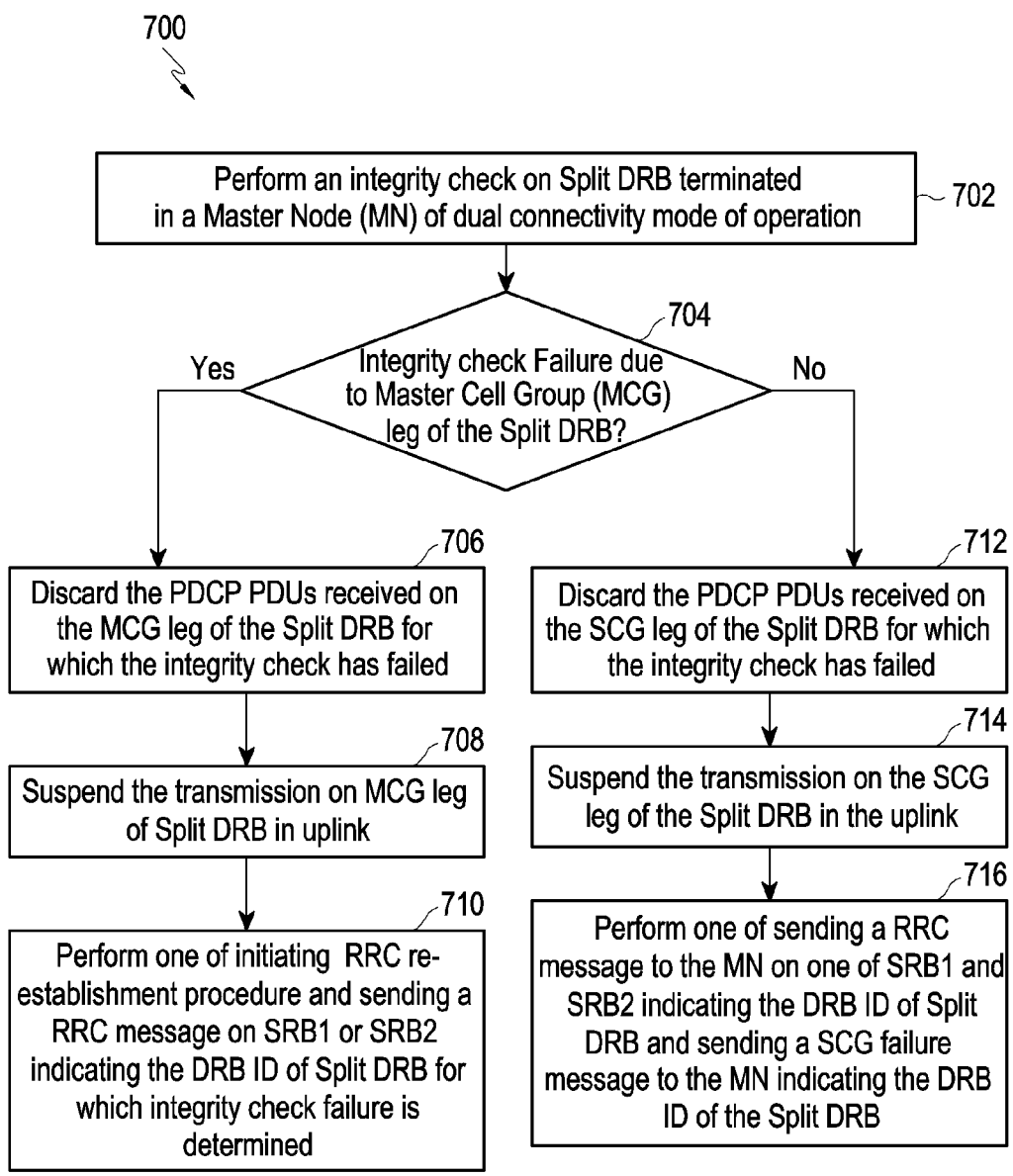
FIG. 7 is a flow diagram illustrating a method for handling integrity check failure detected on a Split DRB associated with the MN, according to the embodiments as disclosed herein.

FIG. 7 is a flow diagram 700 illustrating a method for handling integrity check failure on Split DRB associated with MN, according to the embodiments as disclosed herein. The following actions are performed by the UE 300 for handling integrity check failure on Split DRB associated with MN.

In an embodiment, all MCG DRBs are re-established: If on MCG Split DRB integrity protections is configured and upon detecting integrity check failure on MCG Split DRB, then check the number of PDCP PDUs for which the MAC-I fails continuously/consecutively. For example, the UE 300 can maintain INTEGRITY_CHK_FAIL_COUNTER for each DRB for which integrity protection is configured. The INTEGRITY_CHK_FAIL_COUNTER is set to zero when DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB. If the number of PDCP PDUs for which MAC-I fails continuously/consecutively is below a threshold (or INTEGRITY_CHK_FAIL_COUNTER <threshold), then the PDCP layer discards the PDCP PDUs.

If the number of PDCP PDUs for which MAC-I fails continuously/consecutively is above a threshold (INTEGRITY_CHK_FAIL_COUNTER >=threshold), then PDCP discards the PDCP PDU, suspends both legs of this DRB, the PDCP layer informs to RRC layer about failure, and the RRC layer sends a RRC message indicating integrity failure to the MN 100. The UE 300 includes in RRC message indicating integrity failure, the DRB ID of the DRB on which integrity is failed to the MN 100. The MN 100 signals the UE 300 to re-establish the affected DRB or all DRBs with security key (i.e. KeNB) refresh. In an embodiment, if the number of PDCP PDUs for which MAC-I fails continuously/consecutively (for a PDCP COUNT, which is greater than the last successfully integrity checked PDCP COUNT or which is within the PDCP COUNT window) is above a threshold (or INTEGRITY_CHK_FAIL_COUNTER>= threshold), then the PDCP layer discards the PDCP PDU, suspends both legs of this DRB, then PDCP layer sends a PDCP control PDU indicating integrity failure to MN 100. The MN 100 signals the UE 300 to re-establish the affected MCG Split DRB and all MCG DRBs with security key (i.e. KeNB) refresh.

In another embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (or INTEGRITY_CHK_FAIL_COUNTER <threshold), then PDCP just discards the PDCP PDUs. If the number of PDCP PDUs for which MAC-I fails is above a threshold (INTEGRITY_CHK_FAIL_COUNTER >=threshold), then the PDCP layer discards the PDCP PDUs, suspends this DRB, and then PDCP indicates to RRC about failure, and RRC send a RRC message indicating integrity failure to the MN 100. The UE 300 includes in RRC message indicating integrity failure, the DRB ID of the DRB on which integrity is failed to the MN. MN signals the UE 300 to re-establishes the affected DRB or all DRBs with security key (i.e. KeNB) refresh. In an embodiment, if the number of PDCP PDUs for which MAC-I fails is above a threshold (or INTEGRITY_CHK_FAIL_COUNTER >=threshold), then PDCP discards the PDCP PDU, suspends both legs of this DRB, then PDCP sends a PDCP control PDU indicating integrity failure to MN. MN signals the UE to re-establish the affected MCG Split DRB and or all MCG DRBs with security key (i.e. KeNB) refresh.

In an embodiment, only affected DRB is re-established: If on MCG Split DRB integrity protection is configured and upon detecting integrity check failure on Split DRB, the PDCP layer discards the PDCP PDU on which integrity check is failed, suspends this DRB, PDCP informs to RRC about failure, and RRC send a RRC message indicating integrity failure to MN 100. The UE 300 includes in RRC message indicating integrity failure, the DRB ID of the DRB on which integrity is failed to the MN. MN signals the UE 300 to re-establish only the affected DRB. In an embodiment, the PDCP layer discards the PDCP PDU on which integrity check is failed, suspends this DRB, and then PDCP layer sends a PDCP control PDU indicating integrity failure to MN 100. The MN 100 signals the UE 300 to re-establish only the affected DRB. If integrity check failure is detected on one MCG Split DRB while other DRBs established on MN 100 there is no integrity check failure (INTEGRITY_CHK_FAIL_COUNTER <threshold), then if security key need to be refreshed for affected MCG split DRB which is re-established then all unaffected MCG DRBs need to be re-established since security key is common for all DRBs. If security key is per DRB, then (KUPint) and (KUPenc) of the affected MCG Split DRB can be refreshed and only the affected MCG Split DRB is re-established. This avoids PDCP re-establishment of unaffected MCG DRBs. The UE 300 actions for integrity check failure can be based on N consecutive packet failure (i.e., INTEGRITY_CHK_FAIL_COUNTER >=threshold) or based N packets which failed but are not contiguous.

In an embodiment, the UE performs RRC re-establishment procedure: if on MCG Split DRB integrity protection is configured and upon detecting integrity check failure on Split DRB established on the MN 100, then the UE 300 checks the number of PDCP PDUs for which the MAC-I fails continuously/consecutively. For example, the UE 300 can maintain INTEGRITY_CHK_FAIL_COUNTER for each DRB for which integrity protection is configured. The INTEGRITY_CHK_FAIL_COUNTER is set to zero when DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB. If the number of PDCP PDUs for which MAC-I fails continuously/consecutively is below a threshold (INTEGRITY_CHK_FAIL_COUNTER <threshold), then PDCP just discards the PDCP MU. If the number of PDCP PDUs for which MAC-I fails continuously/consecutively is above a threshold (or INTEGRITY_CHK_FAIL_COUNTER >=threshold), then PDCP discards the PDCP PDU, suspends this DRB, PDCP informs to RRC about failure, and RRC re-establishes the connection.

In another embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (INTEGRITY_CHK_FAIL_COUNTER <threshold), then the PDCP layer discards the PDCP PDU. If the number of PDCP PDUs for which MAC-I fails is above a threshold (or INTEGRITY_CHK_FAIL_COUNTER >=threshold), then PDCP discards the PDCP PDU, suspends this DRB, PDCP informs to RRC about failure, and RRC re-establishes the connection.

In an embodiment, the UE 300 identifies the leg of the MCG Split DRB which resulted in integrity check failure: The UE 300 determines whether the MAC-I failure is due to RLC SDU coming from the MCG leg or the SCG leg of the MCG Split DRB. INTEGRITY_CHK_FAIL_COUNTER is maintained for each leg of MCG Split DRB. If INTEGRITY_CHK_FAIL_COUNTER >=threshold for MCG leg then failure is because of MCG leg. If INTEGRITY_CHK_FAIL_COUNTER >=threshold for SCG leg then failure is because of SCG leg. If the failure is because of MCG leg of MCG split DRB, the RRC layer initiates RRC Connection Re-establishment procedure. If the failure is because of SCG leg of MCG split DRB, RRC declares SCG failure and performs the following:

a. Suspend direct SCG SRB and suspend SCG transmission on the SCG leg of the MCG split SRB;
b. Suspend all SCG DRBs;
c. Suspend SCG transmission on the SCG leg of the MCG split DRBs;
d. Suspend SCG transmission on the SCG leg of the SCG split DRBs;
e. Reset SCG-MAC;
f. Send the SCGFailureInformation message to the MN with corresponding cause value (i.e. integrity check failure).

In another embodiment if on MCG Split DRB integrity protection is configured and upon detecting the leg which contributed to integrity checks failure on MCG Split DRB, the PDCP layer discards the PDCP PDU on which integrity check is failed. The PDCP layer informs to RRC layer about failure and the leg which resulted in integrity check failure. If the failure is because of MCG leg of MCG split DRB, the RRC layer initiates RRC Connection Re-establishment procedure if one or more MCG DRBs experience integrity check failure. If the failure is because of SCG leg of MCG split DRB, RRC declares SCG failure if at least the SCG SRB experiences integrity check failure and send the SCGFailureInformation message to the MN 100 with corresponding cause value. In this case there is no threshold based criteria or the threshold is set to 1 for the PDCP to take action on detecting integrity check failure.

In yet another embodiment, the UE 300 determine whether the MAC-I failure is due to RLC SDU coming from the MCG leg or the SCG leg of the MCG Split DRB. Depending on from which RLC the PDCP PDU on which MAC-I failed was received, the UE PDCP layer can determine on which leg the packet injection attack has occurred. For example, if the PDCP PDU on which MAC-I failed was received from SCG RLC entity then packet injection attack has occurred on SCG leg and if the PDCP PDU on which MAC-I failed was received from MCG RLC entity then packet injection attack has occurred on MCG leg. Upon determining the leg which contributed to integrity check failure, the PDCP can indicate the affected leg of the MCG split DRB to RRC and RRC can trigger suspension of the affected leg while continuing data transmission on the unaffected leg of MCG split DRB. If the failure is because of MCG leg of MCG split DRB, RRC suspends the MCG leg but the SCG leg is continued if the integrity check at PDCP passes. The UE 300 sends RRC message to MN to indicate the MCG leg of the MCG Split DRB is affected. If the failure is because of SCG leg of MCG split DRB, RRC suspends the SCG leg but the MCG leg is continued if the integrity check at PDCP layer passes. The UE 300 sends RRC message to MN 100 to indicate the SCG leg of the MCG Split DRB is affected.

The above mentioned details are presented as steps in the flow diagram 700. The various steps of the flow diagram 700 are detailed below.

At step 702, the method includes performing an integrity check on Split DRB terminated in a MN 100 of dual connectivity mode of operation. The UE 300 is configured to perform an integrity check on Split DRB terminated in a MN 100 of dual connectivity mode of operation.

At step 704, the method includes identifying whether the integrity check failure is due to MCG leg of the Split DRB. The UE 300 is configured to identify whether the integrity check failure is due to MCG leg of the Split DRB. If it is identified that the integrity check failure is due to MCG leg of the Split DRB, then at step 706, the method includes discarding the PDCP PDUs received on the MCG leg of the Split DRB for which the integrity check has failed. The UE 300 is configured to discard the PDCP PDUs received on the MCG leg of the Split DRB for which the integrity check has failed.

At step 708, the method includes suspending the transmission on MCG leg of Split DRB in uplink. The UE 300 is configured to suspend the transmission on MCG leg of Split DRB in uplink.

At step 710, the method includes perform either initiating RRC re-establishment procedure or sending a RRC message on SRB1 or SRB2 indicating the DRB ID of Split DRB for which integrity check failure is determined. The TIE 300 is configured to initiate either RRC re-establishment procedure or to send a RRC message on SRB1 or SRB2, indicating the DRB ID of Split DRB for which integrity check failure is determined.

If at step 704, it is identified that the integrity check failure is due to SCG leg of the Split DRB, then at step 712, the method includes discarding the PDCP PDUs received on the SCG leg of the Split DRB for which the integrity check has failed. The UE 300 is configured to discard the PDCP PDUs received on the SCG leg of the Split DRB for which the integrity check has failed.

At step 714, the method includes suspending the transmission on the SCG leg of the Split DRB in the uplink. The UE 300 is configured to suspend the transmission on the SCG leg of the Split DRB in the uplink.

At step 716, the method includes of sending a RRC message to the MN 100 on SRB1 or SRB2 indicating the DRB ID of Split DRB or sending a SCG failure message to the MN 100 indicating the DRB ID of the Split DRB. The UE 300 is configured to send either the RRC message to MN 100 on SRB1 or SRB2 indicating the DRB ID of Split DRB or to send a SCG failure message to the MN 100 indicating the DRB ID of the Split DRB.

The various actions, acts, blocks, steps, or the like in the flow chart 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
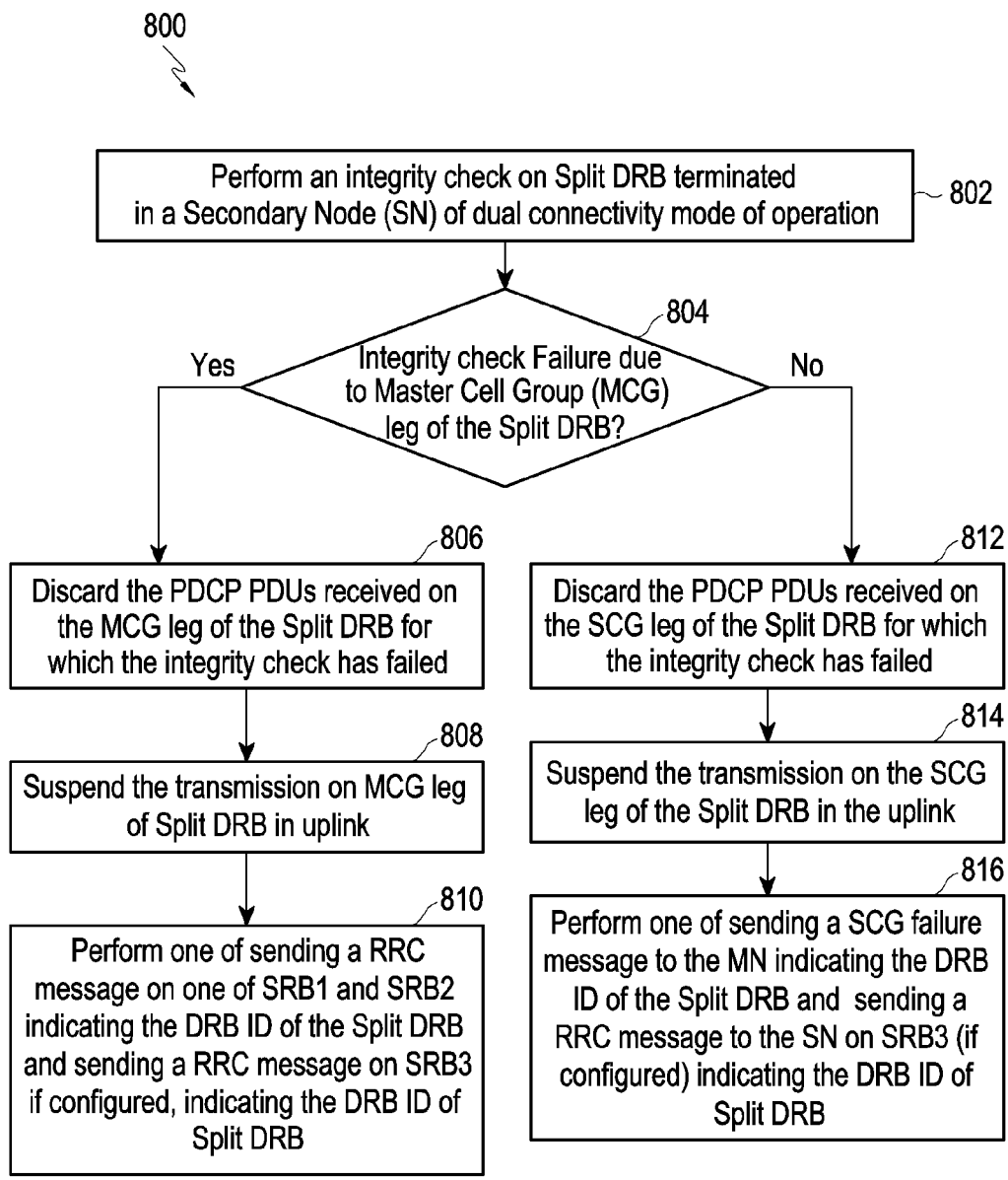
FIG. 8 is a flow diagram illustrating a method for handling integrity check failure detected on a Split DRB associated with the SN, according to the embodiments as disclosed herein.

FIG. 8 is a flow diagram 800 illustrating a method for handling integrity check failure on Split DRB associated with SN, according to the embodiments as disclosed herein.

In an embodiment, all SCG DRBs are re-established: If on SCG split DRB integrity protections is configured and upon detecting integrity check failure on split DRB, the UE 300 checks the number of PDCP PDUs for which the MAC-I fails continuously/consecutively. For example, the UE 300 can maintain INTEGRITY_CHK_FAIL_COUNTER for each SCG split DRB for which integrity protection is configured. The INTEGRITY_CHK_FAIL_COUNTER is set to zero when SCG split DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB. If the number of PDCP PDUs for which MAC-I fails continuously/consecutively is below a threshold (or INTEGRITY_CHK_FAIL_COUNTER threshold), then PDCP just discards the PDCP PDU. If the number of PDCP PDUs for which MAC-I fails continuously/consecutively is above a threshold (or INTEGRITY_CHK_FAIL_COUNTER >=threshold), then the PDCP layer discards the PDCP PDU, suspends both legs of this DRB. Further, the PDCP layer indicates to RRC layer about failure, and the RRC layer sends a RRC message indicating integrity failure at SN 200 to the MN 100. The UE 300 includes in RRC message indicating integrity failure, the DRB ID of the DRB on which integrity is failed to the MN 100. The MN 100 or SN 200 signals the UE 300 to re-establish the affected SCG Split DRB and all SCG DRBs with security key (i.e. S-KgNB) refreshed. In an embodiment, the number of PDCP PDUs for which MAC-I fails continuously/consecutively (for a PDCP COUNT, which is greater than the last successfully integrity checked PDCP COUNT or which is within the PDCP COUNT window) is above a threshold (or INTEGRITY_CHK_FAIL_COUNTER >=threshold), then PDCP discards the PDCP PDU, suspends both legs of this DRB, then PDCP sends a PDCP control PDU indicating integrity failure to SN. SN signals the UE to re-establish the affected SCG Split DRB and all SCG DRBs with security key (i.e. S-KgNB) refresh.

In an embodiment, the INTEGRITY_CHK_FAIL_COUNTER is set to zero when DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (or INTEGRITY_CHK_FAIL_COUNTER <threshold), then PDCP just discards the PDCP PDU. If the number of PDCP PDUs for which MAC-I fails is above a threshold (or INTEGRITY_CHK_FAIL_COUNTER >=threshold), then PDCP discards the PDCP PDU, suspends both legs of this DRB, then the PDCP layer indicates to the RRC layer about failure, and the RRC layer sends a RRC message indicating integrity failure at the SN 200 to the MN 100. The UE 300 includes in RRC message indicating integrity failure, the DRB ID of the DRB on which integrity is failed to the MN

100. The MN 100 or SN 200 signals the UE 300 to re-establish the affected SCG split DRB and all SCG DRBs with security key (i.e. S-KgNB) refresh. In an embodiment, if the number of PDCP PDUs for which MAC-I fails is above a threshold (or INTEGRITY_CHK_FAIL_COUNTER >=threshold), then. PDCP discards the PDCP PDU, suspends both legs of this DRB, then PDCP sends a PDCP control PDU indicating integrity failure to SN. SN signals the HE to re-establish the affected SCG Split DRB and all DRBs with security key (i.e. S-KgNB) refresh.

In an embodiment, only affected DRB re-established: If on SCG Split DRB integrity protection is configured and upon detecting integrity check failure on SCG Split DRB, the PDCP layer discards the PDCP PDU on which integrity check is failed, suspends both legs of this DRB, the PDCP layer informs to RRC layer about failure, and the RRC layer sends a RRC message indicating integrity failure to the MN 100. The UE 300 includes in RRC message indicating integrity failure, the DRB ID of the DRB on which integrity is failed to the MN 100. The MN 100 signals the UE 300 to re-establish only the affected MCG Split DRB. In an embodiment, the PDCP layer discards the PDCP PDU on which integrity check is failed, suspends both legs of this DRB, and then the PDCP layer sends a PDCP control PDU indicating integrity failure to the MN 100. The MN 100 signals the UE 300 to re-establish only the affected MCG Split DRB if integrity check failure is detected on one SCG Split DRB while other DRBs established on SN 200, there is no integrity check failure (INTEGRITY_CHK_FAIL_COUNTER <threshold), then if security key need to be refreshed for affected SCG split DRB which is re-established then all unaffected SCG DRBs need to be re-established since security key is common for all DRBs. If security key is per DRB, then ($K_{UPint}$) and ($K_{UPenc}$) of the affected SCG Split DRB can be refreshed and only the affected SCG Split DRB is re-established. This avoids PDCP re-establishment of unaffected SCG DRBs. The HE 300 actions for integrity check failure can be based on N consecutive packet failure (i.e. INTEGRITY_CHK_FAIL_COUNTER >=threshold) or based N packets which failed but are not contiguous.

In an embodiment, the UE 300 declares SN (SgNB) failure: if on SCG split DRB integrity protections is configured and upon detecting integrity check failure on SCG Split DRB established, then the UE 300 checks the number of PDCP PDUs for which the MAC-I fails continuously/consecutively. For example, the UE 300 can maintain INTEGRITY_CHK_FAIL_COUNTER for each SCG split DRB for which integrity protection is configured. The INTEGRITY_CHK_FAIL_COUNTER is set to zero when SCG split DRB is established. INTEGRITY_CHK_FAIL_COUNTER is set to zero when integrity check passes for a PDCP PDU of corresponding DRB. INTEGRITY_CHK_FAIL_COUNTER is incremented by one when integrity check fails for a PDCP PDU of corresponding DRB. If the number of PDCP PDUs for which MAC-I fails continuously/consecutively is below a threshold (or INTEGRITY_CHK_FAIL_COUNTER <threshold), then the PDCP layer discards the PDCP PDUs. If the number of PDCP PDUs for which MAC-I fails continuously/consecutively is above a threshold (or INTEGRITY_CHK_FAIL_COUNTER >=threshold), then the PDCP layers discards the PDCP PDU, the PDCP layer informs to the RRC layer about failure and RRC declares SCG failure and performs the following:
a. Suspend direct SCG SRB and suspend SCG transmission on the SCG leg of the MCG split SRB:
b. Suspend all SCG DRBs;
c. Suspend SCG transmission on the SCG leg of the MCG split DRBs;
d. Suspend SCG transmission on the SCG leg of the SCG split DRBs;
e. Reset SCG-MAC;
f. Send the SCGFailureInformation message to the MN with corresponding cause value (i.e. integrity check failure).

OR alternately instead of declaring SgNB failure, RRC performs following actions
a. Suspend SCG transmission on the SCG leg of the MCG split DRBs,
b. Suspend SCG transmission on the SCG leg of the SCG split DRBs;
c. Continue MCG transmission on the MCG leg of the SCG split DRB
d. Send the RRC message to the MN with corresponding cause values (i.e., integrity check failure).

In an alternate embodiment, the INTEGRITY_CHK_FAIL_COUNTER is set to zero when SCG Split DRB is established. INTEGRITY_CHK_FAIL_COUNTER is incremented by one when integrity check fails for a PDCP PDU of corresponding DRB. It is possible that integrity check may not fail continuously/consecutively so INTEGRITY_CHK_FAIL_COUNTER is not reset to zero when integrity check passes for a PDCP PDU of corresponding DRB. If the number of PDCP PDUs for which MAC-I fails is below a threshold (or INTEGRITY_CHK_FAIL_COUNTER <threshold), then PDCP just discards the PDCP PDU. If the number of PDCP PDUs for which MAC-I fails is above a threshold (or INTEGRITY_CHK_FAIL_COUNTER >=threshold), then PDCP discards the PDCP PDU, then PDCP informs to RRC about failure and RRC declares SCG failure and performs the following:
a. Suspend direct SCG SRB and suspend. SCG transmission on the SCG leg of the MCG split SRB; b. Suspend all SCG DRBs;
c. Suspend SCG transmission on the SCG leg of the MCG split DRBs;
d. Suspend SCG transmission on the SCG leg of the SCG split DRBs;
e. Reset SCG-MAC;
f. Send the SCGFailureInformation message to the MN with corresponding cause value (i.e. integrity check failure).

In an embodiment; instead of declaring SgNB failure, the UE RRC performs following actions:
a. Suspend SCG transmission on the SCG leg of the MCG split DRBs,
b. Suspend SCG transmission on the SCG leg of the SCG split DRBs;
c. Continue MCG transmission on the MCG leg of the SCG split DRB
d. Send the RRC message to the MN with corresponding cause values (i.e. integrity check failure).

In above embodiments when RRC triggers SCG Split DRB re-establishment, the UE does not determine whether the MAC-I failure is due to RLC SDU coming from the MCG leg or the SCG leg of the SCG Split bearer.

In an embodiment, the UE 300 identifies the leg of the SCG Split DRB which resulted in integrity check failure: The TIE 300 determines whether the MAC-I failure is due to RLC SDU coming from the MCG leg or the SCG leg of the SCG Split bearer. Depending on from which RLC the PDCP PDU for which MAC-I has failed, the PDCP layer can determine on which leg the packet injection attack has occurred. For example, if the PDCP PDU on which MAC-I failed was received from SCG RLC entity, then packet injection attack has occurred on SCG leg and if the PDCP PDU on which MAC-I failed was received from MCG RLC entity then packet injection attack has occurred on MCG leg, Upon determining the leg which contributed to integrity check failure, the PDCP layer can indicate the affected leg of the SCG split DRB to RRC and RRC can trigger suspension of the affected leg while continuing data transmission on the unaffected leg. If the LTI; 300 determines that SCG leg has contributed to integrity check failure then the UE 300 may 1) Suspend only the SCG leg of SCG split DRB on which integrity failed was detected.
OR
2) Suspend SCG transmission on the SCG leg of all MCG split SRBs;
3) Suspend SCG transmission on the SCG leg of all SCG split DRBs;
OR
4) Suspend SCG transmission on the SCG leg of all MCG split DRBs and MCG split SRBs;
5) Suspend SCG transmission on all SCG DRBs and SCG SRB;

If UE determines that MCG leg has contributed to integrity check failure then UE may
1) Suspend only the MCG leg of SCG split DRB on which integrity failed was detected.
OR;
2) Suspend MCG transmission on the MCG leg of all MCG split SRBs;
3) Suspend MCG transmission on the MCG leg of all SCG split DRBs;
OR
4) Reestablish RRC connection In another embodiment, the UE 300 determines whether the MAC-I failure is due to RLC SDU coming from the MCG leg or the SCG leg of the SCG Split DRB. Depending on from which RLC the PDCP PDU on which MAC-I failed was received, the UE PDCP can determine on which leg the packet injection attack has occurred. For example, if the PDCP PDU on which MAC-I failed was received from SCG RLC entity then packet injection attack has occurred on SCG leg and if the PDCP PDU on which MAC-I failed was received from MCG RLC entity then packet injection attack has occurred on MCG leg. Upon determining the leg which contributed to integrity check failure, the PDCP can indicate the affected leg of the SCG split DRB to RRC and RRC can trigger suspension of the affected leg while continuing data transmission on the unaffected leg of SCG split DRB. If the failure is because of MCG leg of SCG split DRB, the RRC layer suspends the MCG leg but the SCG leg is continued if the integrity check at PDCP passes. UE 300 sends RRC message to MN 100 to indicate the MCG leg of the SCG Split DRB is affected. If the failure is because of SCG leg of SCG split DRB, RRC suspends the SCG leg but the MCG leg is continued if the integrity check at PDCP passes. The UE 300 sends RRC message to MN 100 to indicate the SCG leg of the SCG Split DRB is affected.

The above mentioned details are presented as steps in the flow diagram 800. The various steps of the flow diagram 800 are detailed below.

At step 802, the method includes performing an integrity check on Split DRB terminated in a SN 200 of dual connectivity mode of operation. The UE 300 is configured to perform the integrity check on Split DRB terminated in the SN 200 of dual connectivity mode of operation.

At step 804, the method includes identifying whether the integrity check failure is due to MCG leg of the Split DRB. The HE 300 is configured to identify whether the integrity check failure is due to MCG leg of the Split DRB. If it is identified that the integrity check failure is due to MCG leg of the Split DRB, then at step 806, the method includes discarding the PDCP PDUs received on the MCG leg of the Split DRB for which the integrity check has failed. The UE 300 is configured to discard the PDCP PDUs received on the MCG leg of the Split DRB for which the integrity check has failed.

At step 808, the method includes suspending the transmission on MCG leg of Split DRB in uplink. The UE 300 is configured to suspend the transmission on MCG leg of Split DRB in uplink.

At step 810, the method includes sending a RRC message on either SRB1 or SRB2 indicating the DRB ID of the Split DRB for which the integrity check is failed or sending a RRC message on SRB3 if configured, indicating the DRB ID of Split DRB for which the integrity check is failed. The UE 300 is configured to send the RRC message on either SRB1 or SRB2 indicating the DRB ID of the Split DRB for which the integrity check is failed or the HE 300 is configured to send a RRC message on SRB3 if configured, indicating the DRB ID of Split DRB for which integrity check failure is determined.

If at step 804, it is identified that the integrity check failure is due to SCG leg of the Split DRB, then at step 812, the method includes discarding the PDCP PDUs received on the SCG leg of the Split DRB for which the integrity check failure is determined. The UE 300 is configured to discard the PDCP PDUs received on the SCG leg of the Split DRB for which the integrity check failure is determined.

At step 814, the method includes suspending the transmission on the SCG leg of the Split DRB in the uplink. The UE 300 is configured to suspend the transmission on the SCG leg of the Split DRB in the uplink.

At step 816, the method includes sending a SCG failure message to the MN 100 indicating the DRB ID of the Split DRB for which the integrity check failure is determined or sending a RRC message to the SN 200 on SRB3 (if configured) indicating the DRB ID of Split DRB for which the integrity check failure is determined. The UE 300 is configured to send a SCG failure message to the MN 100 indicating the DRB ID of the Split DRB for which the integrity check failure is determined or the UE 300 is configured to send the RRC message to the SN 200 on SRB3 (if configured) indicating the DRB ID of Split DRB for which the integrity check failure is determined.

The various actions, acts, blocks, steps, or the like in the flow chart 800 may be performed in the order presented, in a different order or simultaneously. Further, in some embodiments, some of the actions, acts, blocks, steps, or the like may be omitted, added, modified, skipped, or the like without departing from the scope of the invention.

Unified Split DRB for which PDCP entity anchored in MN: Derivation of UP encryption key (i.e. $K_{UPenc}$) from KeNB can be different in NR compared to LTE. If this is the case, then there is issue how to generate UP keys for unified Split DRB for which PDCP entity is terminated in MN.

Option 1a: Generate $K_{UPenc}$ from KeNB using mechanism defined in LTE. Use this in LTE PDCP (for MCG DRB) as well as NR-PDCP used for unified split DRB anchored in MN Option 2a: Generate $K_{UPenc}$ from KeNB using mechanism defined in NR. Use this in LTE PDCP (for MCG DRB) as well as NR-PDCP used for unified split DRB anchored in MN Option 3a: Generate $K_{UPenc}$ from KeNB using mechanism defined in LTE. Generate $K_{2UPenc}$ from KeNB using mechanism defined in NR. Use $K_{1UPenc}$ in LTE PDCP (for MCG DRB) and $K_{2UPenc}$ in NR PDCP used for unified split DRB anchored in MN The integrity protection key is derived similar to UP encryption key as mentioned above.

Unified Split DRB for which PDCP entity anchored in SN:

Option 2b: Generate $K_{UPenc}$ from S-KgNB using mechanism defined in NR. Use this in NR PDCP (for SCG DRB) as well as NR-PDCP used for unified split DRB anchored in SN Option 3b: Generate separate $K_{1UPenc}$ from S-KgNB using mechanism defined in NR. Generate separate $K_{2UPenc}$ from S-KgNB using mechanism defined in NR. Use $K_{1UPenc}$ in NR PDCP (for SCG DRB) and $K_{2UPenc}$ in NR PDCP used for unified split DRB anchored in SN The integrity protection key is derived similar to UP encryption key as mentioned above.

The NR-PDCP supports integrity protection. For the unified Split DRB anchored in MN i.e., LTE. The NR-PDCP at the UE 300 needs to know whether to apply integrity protection or not. This can be achieved by adding configuration of integrity protection for split bearer in LTE specification i.e. TS 36.331 Alternately, it can be specified that integrity protection for unified split DRB anchored in LTE the integrity protection is disabled by default.

One more issue is how the UE knows whether it has to establish NR-PDCP entity for a unified split DRB anchored in MN (i.e. LTE node). One option is to have an explicit indication in PDCP-Config. Another option is implicit based on the indication of the security key indicated in PDCP-Config to be used for the unified split DRB. Yet another alternative is based on integrity protection enable/disable indication in PDCP-Config.

The unified Split DRB can also be used for the architecture option where MN is NR and SN is LTE. The security key i.e. UP encryption key and integrity protection key is derived in the same way as mentioned above.

For unified Split DRB the UE 300 behavior can be according to methods described in the FIG. 7.

Preventing the DoS Attack on all DRBs Due to Integrity Protection Failure:

Key Derivation:

In an embodiment, unlike the traditional LTE UP encryption Key usage (one key ($K_{UPenc}$) for all DRBs), each DRBs use a unique key for protection (encryption and/or Integrity Protection). Unique key is required for clear isolation of the DRBs and to break the dependency on single key for all DRBs at the PDCP layer, doing so would help to mitigate the Denial of Service (DoS) or lessen the effect of DoS attack on the UE. If single key is used for all the DRBs, an attacker by sending dummy UP packets makes the integrity check unsuccessful in the UE and/or in the network. Frequent integrity check failure can make the network to re-establish all the DRBs and further repeated attempts; the attacker makes the network to detach the UE. The unique key per DRB is derived from the root/master Access Stratum key: KgNB or S-KgNB, with DRB ID as one of the input along with other possible inputs. The key derivation function for UP integrity protection for a DRB ID is given as follow:

$K_{UPintDRB1}$=HMAC-SHA-256 (Key, S)

The input key shall be $K_{eNB}/K_{gNB}$ of the gNB or the $K_{eNB}$ of the enhanced eNB.

String S shall be constructed from n+1 input parameters S=FC∥P0∥L0∥ . . . ∥Pn∥Ln. In the below illustration, DRB identity is considered as "1"

P0=technique type distinguisher
L0=length of technique type distinguisher (i.e. 0x00 0x01)
P1=technique identity
L1=length of technique identity (i.e. 0x00 0x01)
P2=Value of the DRB-1 Identity
L2=length of the DRB-1 Identity S contains the above inputs and may contain other possible inputs.

FC is used to distinguish between different instances of the technique and is either a single octet or consists of two octets.

Similarly, the key derivation function for UP encryption protection for a DRB ID '1" is given as follow:

$K_{UPencDRB1}$=HMAC-SHA-256 (Key, S)

Key Refresh:

In case that PDCP COUNT value of a DRB is about to wrap around, then only that particular DRB key is refreshed. Key refresh for a DRB is accomplished using a procedure based on PDCP Re-establishment procedure, where a new DRIB ID is assigned. The new DRB ID is from a pool of DRB IDs which are not assigned for a particular UE; the assigned DRB ID is used deriving a fresh unique key (based on above detailed key derivation). The DRB ID for which PDCP COUNT wraps around is not assigned to anymore, until the AS security root key (KgNB/S-KgNB) is refreshed. When the DRB IDs from the DRIB ID pool is exhausted (when there are more number of new DRBs or frequent PDCP re-establishments occurs), then the root/master key (i.e. KeNB/KgNB) is refresh, so that key repetition is avoided.

Figure 9:
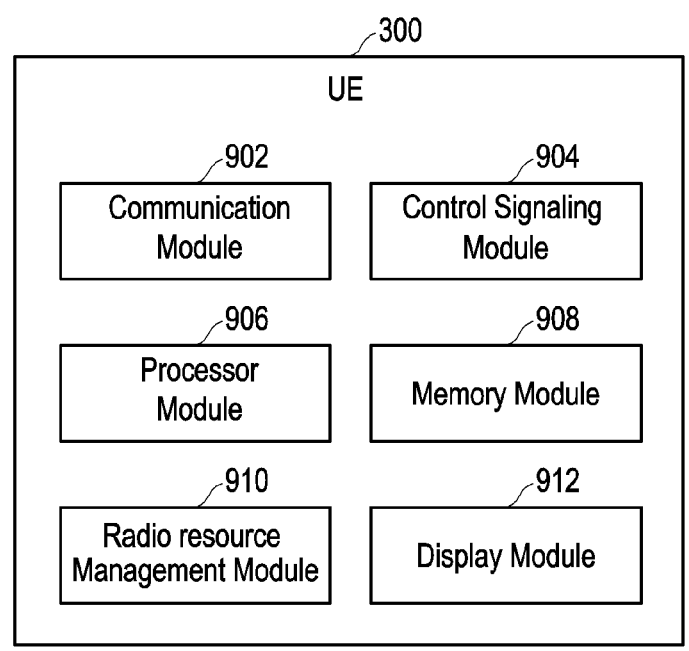
FIG. 9 is a block diagram illustrating various modules of the UE, according to an embodiment as disclosed herein.

FIG. 9 is a block diagram illustrating various modules of the UE 300, according to an embodiment as disclosed herein. The primary blocks present in the UE 300 includes a communication module 902, a control signaling module 904, a processor module 906, a memory module 908, a radio resource management module 910 and a display module 912. In an embodiment, the communication module 902 is configured to receive radio signals from the MN 100 and the SN 200. The communication module 902 includes a RF transceiver module (or dual RF modules), coupled with the antenna, receives RE signals from antenna, converts them to baseband signals and sends them to the processor 906.

Although not shown in the FIG. 9, the UE 300 includes a 3GPP protocol stack supporting various protocol layers including NAS AS/RRC, dual PDCP, dual RLC, dual MAC and dual PITY, a TCP/IP protocol stack, an application module. The UE 300 with dual connectivity has two MAC entities. Two sets of upper layer stacks (RLC/PDCP) are configured for the MAC entities. At the RRC layer, only one RRC is configured. The RRC controls the protocol stacks corresponding to the MAC entities by communicating with the RRC entity of a serving MN 100.

The control signaling module 904 in the UE 300 can be configured to prepare the related RRC messages to be transmitted to the MN 100 or the SN 100 and also can be configured to parse the related RRC messages received from the MN 100 or SN 200.

The processor module 906 depicts a computing environment in the UE 300 for implementing method for handling of integrity check failures of PDCP PDUs. The computing environment of 906 comprises at least one processing unit that is equipped with a control unit and an Arithmetic Logic Unit (ALU), a clock chip, plurality of networking devices, and a plurality Input output (I/O) devices. The processor module 1506 is responsible for processing the instructions of the technique. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the technique. The technique comprising of instructions and codes required for the implementation are stored in either the memory module 908 or the storage or both. At the time of execution, the instructions may be fetched from the corresponding memory module 908 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. Further, the memory module 908 is also configured to store information related to UE operation.

The radio resource management module 910 in the UE 102 is responsible for various aspects like cell level mobility or the like. The display module 912 in the HE 300 can be configured so that user can input information or information can output on the display for the user to understand some LTE 300 operations when the HE 300 is operating in dual connectivity mode of operation. Most of the UE 300 operations are transparent to the user and may not need user input nor output on the display module 912.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling of integrity check failures of packet data convergence protocol (PDCP) protocol data units (PDUs) by a user equipment (UE) in a wireless communication system, the method comprising:
    performing an integrity check at a PDCP layer on at least one radio bearer based on a message authentication code-integrity (MAC-I) of the PDCP PDU;
    determining one of a success of the integrity check of the PDCP PDU and a failure of the integrity check of the PDCP PDU received on the at least one radio bearer in case that the UE is simultaneously connected to a master node (MN) and a secondary node (SN) for a dual connectivity mode;
    discarding the PDCP PDU for which integrity check is failed; and
    indicating a radio resource control (RRC) layer about the integrity check failure on the at least one radio bearer in response to determining a trigger condition,
    wherein a PDCP termination point of each of the at least one radio bearer is determined in the MN in case that a security key for handling integrity protection and encryption of each of the at least one radio bearer is associated with an MN security key, and
    wherein the PDCP termination point of each of the at least one radio bearer is determined in the SN in case that the security key for handling integrity protection and encryption of each of the at least one radio bearer is associated with an SN security key.

2. The method of claim 1, wherein performing the integrity check at the PDCP layer comprises:
    generating a MAC-I using a configured integrity technique;
    checking with the MAC-I in the PDCP PDU;
    determining the integrity check of the PDCP PDU is successful if the generated MAC-I matches with the MAC-I; and
    determining the integrity check of the PDCP PDU is failed if one of: the generated MAC-I does not match with the MAC-I and the MAC-I is missed.

3. The method of claim 1, wherein determining the trigger condition comprises detecting the integrity check failure continuously for a pre-configured number of consecutive PDCP PDUs received on the at least one radio bearer, and
    wherein the integrity check failed indication to the RRC layer for the radio bearer is associated with at least one of a signaling radio bearer 1 (SRB1), a SRB2, a SRB3, a split SRB, a data radio bearer (DRB) and a split DRB.

4. The method of claim 1, wherein the radio bearer is one of: a DRB terminated in the MN for the dual connectivity mode and a DRB terminated in a serving node of standalone operation, the method comprises:
    discarding the PDCP PDUs received on the DRB for which the integrity check has failed;
    suspending a transmission on an associated DRB in an uplink; and
    performing at least one of initiating a RRC connection re-establishment procedure and sending a RRC message to one of: the MN and the serving node indicating a DRB ID for which integrity check failure is determined.

5. The method of claim 1, wherein the radio bearer is a DRB terminated in the SN for the dual connectivity mode, the method comprises:
    declaring, by the RRC layer, a failure of the SN if integrity check failure for DRB is determined;
    discarding the PDCP PDUs received on the DRB for which the integrity check has failed;
    suspending a transmission on an associated DRB in an uplink; and
    performing one of: sending a SCG failure message to the MN indicating a DRB ID for which integrity check failure is determined and sending a RRC message on SRB3 if configured indicating the DRB ID for which integrity check failure is determined.

6. The method of claim 1, wherein the radio bearer is a SRB3 terminated in the SN for the dual connectivity mode, the method comprises:
    declaring, by the RRC layer, a failure of the SN if integrity check failure for SRB3 is determined;
    suspending a transmission on SRB3 in an uplink;
    suspending a transmission on SCG leg of a split SRB in the uplink if configured;
    suspending all DRBs associated with the SN; and sending a secondary cell group (SCG) failure message to the MN indicating integrity check failure for SRB3 is determined.

7. The method of claim 1, wherein the radio bearer is a split SRB terminated in the MN for the dual connectivity mode, the method comprises:
identifying whether the integrity check failure is due to master cell group (MCG) leg of the split SRB; and
initiating a RRC connection re-establishment procedure in response to determining that the integrity check failure is due to MCG leg of the split SRB.

8. The method of claim 1, wherein the radio bearer is a split SRB terminated in the MN for the dual connectivity mode, the method comprises:
identifying whether the integrity check failure is due to SCG leg of the split SRB;
declaring, by the RRC layer, a failure of the SN if integrity check failure for SCG leg of the split SRB is determined;
suspending a transmission on SCG leg of split SRB in uplink;
suspending a transmission on SRB3 in the uplink if configured;
suspending a transmission on all DRBs associated with the SN; and
sending a SCG failure message to the MN indicating integrity check failure for split SRB is determined.

9. The method of claim 1, wherein the radio bearer is a split DRB terminated in the MN for the dual connectivity mode, the method comprises:
identifying whether the integrity check failure is due to MCG leg of the split DRB;
discarding the PDCP PDUs received on the MCG leg of the split DRB for which the integrity check has failed;
suspending a transmission on the MCG leg of the split DRB in an uplink; and
performing one of: initiating a RRC re-establishment procedure and sending a RRC message on one of: a SRB1 and a SRB2 indicating a DRB ID of the split DRB for which integrity check failure is determined.

10. The method of claim 1, wherein the radio bearer is a split DRB terminated in the MN for the dual connectivity mode, the method comprises:
identifying whether the integrity check failure is due to SCG leg of the split DRB;
discarding the PDCP PDUs received on the SCG leg of the split DRB for which the integrity check has failed;
suspending a transmission on the SCG leg of the split DRB in an uplink; and
performing one of: sending a RRC message to the MN on one of a SRB1 and a SRB2 indicating a DRB ID of the split DRB for which integrity check failure is determined and sending a SCG failure message to the MN indicating the DRB ID of the split DRB for which integrity checked failure is determined.

11. The method of claim 1, wherein the radio bearer is a split DRB terminated in the SN for the dual connectivity mode, the method comprises:
identifying whether the integrity check failure is due to MCG leg of the split DRB;
discarding the PDCP PDUs received on the MCG leg of the split DRB for which the integrity check has failed;
suspending a transmission on the MCG leg of the split DRB in an uplink; and
performing one of: sending a RRC message on one of: a SRB1 and a SRB2 indicating a DRB ID of the split DRB for which integrity check failure is determined and sending a RRC message on a SRB3 if configured indicating the DRB ID of the split DRB for which integrity check failure is determined.

12. The method of claim 1, wherein the radio bearer is a split DRB terminated in the SN for the dual connectivity mode, the method comprises:
identifying whether the integrity check failure is due to SCG leg of the split DRB;
discarding the PDCP PDUs received on the SCG leg of the split DRB for which the integrity check has failed;
suspending a transmission on the SCG leg of the split DRB in an uplink; and
performing one of: sending a SCG failure message to the MN indicating a DRB ID of the split DRB for which integrity checked failure is determined and sending a RRC message to the SN on SRB3 if configured, indicating the DRB ID of the split DRB for which integrity check failure is determined.

13. A user equipment (UE) for handling of integrity check failures of packet data convergence protocol (PDCP) protocol data units (PDUs) in a wireless communication system, the UE is configured to:
perform an integrity check at a PDCP layer on at least one radio bearer based on a message authentication code-integrity (MAC-I) of the PDCP PDU;
determine one of a success of the integrity check of the PDCP PDU and a failure of the integrity check of the PDCP PDU received on the radio bearer in case that the UE is simultaneously connected to a master node (MN) and a secondary node (SN) for dual connectivity mode;
discard the PDCP PDU for which integrity check is failed; and
indicate a radio resource control (RRC) layer about the integrity check failure on the at least one radio bearer in response to determining a trigger condition,
wherein a PDCP termination point of each of the at least one radio bearer is determined in the MN in case that a security key for handling integrity protection and encryption of each of the at least one radio bearer is associated with an MN security key, and
wherein the PDCP termination point of each of the at least one radio bearer is determined in the SN in case that the security key for handling integrity protection and encryption of each of the at least one radio bearer is associated with an SN security key.

14. The UE of claim 13, wherein the UE is configured to:
generate a MAC-I using a configured integrity technique;
check with the MAC-I in the PDCP PDU;
determine the integrity check of the PDCP PDU is successful if the generated MAC-I matches with the MAC-I; and
determine the integrity check of the PDCP PDU is failed if one of: the generated MAC-I does not match with the MAC-I and the MAC-I is missed.

15. The UE of claim 13, wherein the UE is configured to:
determine the trigger condition comprises detecting the integrity check failure continuously for a pre-configured number of consecutive PDCP PDUs received on the at least one radio bearer, and
wherein the integrity check failed indication to the RRC layer for the radio bearer is associated with at least one of a signaling radio bearer 1 (SRB1), a SRB2, a SRB3, a split SRB, a data radio bearer (DRB) and a split DRB.

16. The UE of claim 13, wherein the radio bearer is one of: a DRB terminated in the MN for the dual connectivity mode, and a DRB terminated in a serving node of standalone operation, and the UE is configured to:

discard the PDCP PDUs received on the DRB for which the integrity check has failed;

suspend a transmission on an associated DRB in an uplink; and perform at least one of initiating a RRC connection re-establishment procedure and sending a RRC message to one of: the MN and the serving node indicating a DRB ID for which integrity check failure is determined.

17. The UE of claim 13, wherein the radio bearer is a DRB terminated in the SN for the dual connectivity mode, and the UE is configured to:

declare, by the RRC layer, a failure of the SN if integrity check failure for DRB is determined;

discard the PDCP PDUs received on the DRB for which the integrity check has failed;

suspend a transmission on an associated DRB in an uplink; and perform one of: sending a SCG failure message to the MN indicating a DRB ID for which integrity check failure is determined and sending a RRC message on SRB3 if configured indicating the DRB ID for which integrity check failure is determined.

18. The UE of claim 13, wherein the radio bearer is a SRB3 terminated in the SN for the dual connectivity mode, and the UE is configured to:

declare, by the RRC layer, a failure of the SN if integrity check failure for SRB3 is determined;

suspend a transmission on SRB3 in an uplink;

suspend a transmission on SCG leg of a split SRB in the uplink if configured;

suspend all DRBs associated with the SN; and send a secondary cell group (SCG) failure message to the MN indicating integrity check failure for SRB3 is determined.

* * * * *